United States Patent
Kamei et al.

(10) Patent No.: US 11,471,822 B2
(45) Date of Patent: *Oct. 18, 2022

(54) INTERNAL AIR ADJUSTMENT DEVICE

(71) Applicant: DAIKIN INDUSTRIES, LTD., Osaka (JP)

(72) Inventors: Noritaka Kamei, Osaka (JP); Naohiro Tanaka, Osaka (JP); Hidenori Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 195 days.

This patent is subject to a terminal disclaimer.

(21) Appl. No.: 16/651,942

(22) PCT Filed: Sep. 27, 2018

(86) PCT No.: PCT/JP2018/036043
§ 371 (c)(1),
(2) Date: Mar. 27, 2020

(87) PCT Pub. No.: WO2019/065879
PCT Pub. Date: Apr. 4, 2019

(65) Prior Publication Data
US 2020/0282356 A1 Sep. 10, 2020

(30) Foreign Application Priority Data
Sep. 29, 2017 (JP) .............................. JP2017-190146

(51) Int. Cl.
*B01D 53/22* (2006.01)
*A01F 25/14* (2006.01)
(Continued)

(52) U.S. Cl.
CPC .............. *B01D 53/22* (2013.01); *A01F 25/14* (2013.01); *B01D 53/30* (2013.01); *F25D 17/045* (2013.01);
(Continued)

(58) Field of Classification Search
None
See application file for complete search history.

(56) References Cited

U.S. PATENT DOCUMENTS 5,457,963 A * 10/1995 Cahill-O'Brien ..... F25D 17/042
62/78
2014/0141139 A1* 5/2014 Gottschlich ............ B01D 53/22
426/418
(Continued)

FOREIGN PATENT DOCUMENTS

CN 203694926 U 7/2014
EP 0 687 966 A2 12/1995
(Continued)

OTHER PUBLICATIONS

Extended European Search Report for European Application No. 18863698.9, dated Apr. 14, 2021.
(Continued)

Primary Examiner — Jason M Greene
(74) Attorney, Agent, or Firm — Birch, Stewart, Kolasch & Birch, LLP

(57) ABSTRACT

An internal air adjustment device that includes a gas composition adjustment unit including a gas separation film and that adjusts a composition of internal air existing inside a storage box, such as a container, includes a pressure regulating valve that regulates a pressure of air that is supplied from an air pump to the gas separation film of the gas composition adjustment unit.

18 Claims, 16 Drawing Sheets

(51) Int. Cl.
*B01D 53/30* (2006.01)
*F25D 17/04* (2006.01)
*A23L 3/3418* (2006.01)

(52) U.S. Cl.
CPC ......... *A23L 3/3418* (2013.01); *A23V 2002/00* (2013.01); *B01D 2053/221* (2013.01); *F25D 2317/041* (2013.01)

(56) References Cited

U.S. PATENT DOCUMENTS

| | | | |
|---|---|---|---|
| 2017/0127705 A1 | 5/2017 | Cermak et al. | |
| 2018/0252461 A1 | 9/2018 | Kamei et al. | |
| 2021/0212332 A1* | 7/2021 | Poulsen | B01D 53/229 |

FOREIGN PATENT DOCUMENTS

| | | | | |
|---|---|---|---|---|
| JP | 1-153015 A | 6/1989 | | |
| JP | 4-75575 | * 3/1992 | ............. | B01D 53/22 |
| JP | 4-75575 A | 3/1992 | | |
| JP | 8-168 A | 1/1996 | | |
| JP | 2002-274608 A | 9/2002 | | |
| JP | 2002274608 | * 9/2002 | ............. | B01D 53/22 |
| JP | 2003-287360 | * 10/2003 | ............. | F25D 19/00 |
| JP | 2003-287360 A | 10/2003 | | |
| JP | 2010-246475 A | 11/2010 | | |
| JP | 2017-125671 A | 7/2017 | | |
| WO | WO 2007/033668 A1 | 3/2007 | | |
| WO | WO 2017/038055 A1 | 3/2017 | | |

OTHER PUBLICATIONS

International Search Report for PCT/JP2018/036043 (PCT/ISA/210) dated Dec. 18, 2018.

* cited by examiner

INTERNAL AIR ADJUSTMENT DEVICE

TECHNICAL FIELD

The present disclosure relates to an internal air adjustment device that adjusts the composition of internal air in a storage box.

BACKGROUND ART

A known internal air adjustment device adjusts, for the purpose of suppressing loss of freshness of plants, such as agricultural products, the composition of internal air (such as the oxygen concentration or the carbon dioxide concentration of the internal air) in a storehouse or a transport container, each accommodating agricultural products or the like.

Patent Literature 1 discloses a container that is provided with a device that adjusts the composition of internal air. The device in Patent Literature 1 adjusts the composition of internal air by using a gas separation film in which the passability of carbon dioxide is higher than the passability of oxygen. Specifically, this device discharges carbon dioxide produced by the respiration of, for example, agricultural products out from the container as a result of the internal air that contains carbon dioxide coming into contact with one surface of the gas separation film and outside air that hardly contains carbon dioxide coming into contact with the other surface of the gas separation film (refer to line 14, page 20 to line 2, page 21 of the description of Patent Literature 1). This device is configured so that, when the oxygen concentration inside the container is reduced, a passage that connects the inside and the outside of the container to each other opens and the outside air flows into the container via the passage (refer to lines 5 to 12, page 20 of the description of Patent Literature 1).

CITATION LIST

Patent Literature

PTL 1: International Publication No. 2007/033668

SUMMARY OF INVENTION

Technical Problem

For the purpose of discharging internal air out from a container via a gas separation film or introducing outside air into the container, a general internal air adjustment device in the art uses an air pump. Here, when the gas flow rate of the air pump is constant (the pump pressure is constant), the separation performance of the gas separation film cannot be adjusted in accordance with necessary gas components.

An object of the present disclosure is to make it possible to adjust the separation performance of a gas separation film in accordance with necessary gas components.

Solution to Problem

A first aspect of the present disclosure is premised on an internal air adjustment device that adjusts a composition of internal air inside a storage box (1).

The internal air adjustment device includes a first composition adjustment unit (40) that includes a first separation unit (41) that separates supply air from external air existing outside the storage box (1) by a gas separation film (85), the supply air having a composition that differs from a composition of the external air, the first composition adjustment unit (40) supplying the supply air into the storage box (1); a second composition adjustment unit (60) that includes a second separation unit (61) that separates discharge air from the internal air existing inside the storage box (1) by a gas separation film (85), the discharge air having a composition that differs from the composition of the internal air, the second composition adjustment unit (60) discharging the discharge air to outside of the storage box (1); and an air pump (36, 37) that supplies air into the first separation unit (41) and the second separation unit (61). The internal air adjustment device includes a pressure regulator (39, 46, 66, 48, 68) that regulates a pressure of air that is supplied from the air pump (36, 37) to at least one of the first separation unit (41) and the second separation unit (61).

In the first aspect, the pressure of air that is supplied from the air pump (36, 37) to the gas separation film (85) is adjusted by the pressure regulator (39, 46, 66, 48, 68). Therefore, it is possible to change the pressure of gas that passes through the gas separation film (85) and to adjust the gas separation performance.

In a second aspect based on the first aspect, the pressure regulator (39, 46, 66, 48, 68) includes a valve mechanism (46, 66) provided on a downstream side with respect to the gas separation film (85). In this structure, for example, a mechanism including a flow rate adjustment valve or a plurality of on-off valves having different apertures and connected in parallel may be used for the valve mechanism (46, 66).

In the second aspect, by using the valve mechanism (46, 66) configured by using, for example, a mechanism including a flow rate adjustment valve or a plurality of on-off valves having different apertures and connected in parallel, it is possible to change the pressure of gas that passes through the gas separation film (85).

According to a third aspect based on the second aspect, the pressure regulator (66) is provided on a downstream side with respect to the separation film (85) of the second composition adjustment unit (60).

In the third aspect, by providing the pressure regulator (66) on the downstream side with respect to the separation film (85) of the second composition adjustment unit (60), the separation pressure of the gas separation film (85) is regulated in a path in which air flows to the outside from the inside of the storage box.

According to a fourth aspect based on the second aspect, the pressure regulator (46, 66) is provided respectively on a downstream side with respect to the separation film (85) of the first composition adjustment unit (40) and on a downstream side with respect to the separation film (85) of the second composition adjustment unit (60).

In the fourth aspect, by providing the pressure regulator (66) on the downstream side with respect to the separation film (85) of the first composition adjustment unit (40) and on the downstream side with respect to the separation film (85) of the second composition adjustment unit (60), the separation pressure of the gas separation films (85) is regulated in a passage in which air flows to the inside from the outside of the storage box and in a passage in which air flows to the outside from the inside of the storage box.

According to a fifth aspect based on the first aspect, the pressure regulator (48, 68) is provided on an inflow side where air flows into the air pump (36, 37).

In the fifth aspect, by regulating the pressure of air on the inflow side where the air flows into the air pump (36, 37), the separation pressure of the gas separation film (85) is regulated.

According to a sixth aspect based on the first aspect, the pressure regulator (48, 68) is provided on an outflow side where air flows out from the air pump (36, 37).

In the sixth aspect, by regulating the pressure of air on the outflow side where the air flows out from the air pump (36, 37), the separation pressure of the gas separation film (85) is adjusted.

According to a seventh aspect based on the first aspect, the pressure regulator (39, 46, 66) includes an inverter (39) that changes a flow rate by changing a frequency of an electric current that is supplied to the air pump (36, 37).

In the seventh aspect, by changing the discharge gas flow rate of the air pump (36, 37) as a result of changing the frequency of electric current by the inverter (39), it is possible to change the pressure of gas that passes through the gas separation film (85).

According to an eighth aspect based on any one of the first aspect to the seventh aspect, the internal air adjustment device includes, in place of the first composition adjustment unit (40), an adsorption unit (234, 235) that is provided with an absorbent, and that separates nitrogen and oxygen/carbon dioxide from the internal air in the storage box (1) and that is capable of producing low oxygen concentration gas and high oxygen concentration gas, the low oxygen concentration gas having a nitrogen concentration that is higher than a nitrogen concentration of the internal air and an oxygen concentration and a carbon dioxide concentration that are lower than an oxygen concentration and a carbon dioxide concentration of the internal air, the high oxygen concentration gas having a nitrogen concentration that is lower than the nitrogen concentration of the internal air and an oxygen concentration and a carbon dioxide concentration that are higher than the oxygen concentration and the carbon dioxide concentration of the internal air.

In the eighth aspect, the structure including, in place of the first composition adjustment unit (40) that separates nitrogen and oxygen from the internal air in the storage box (1) by the gas separation film (85) to produce low oxygen concentration gas and high oxygen concentration gas, the adsorption unit (234, 235) that is provided with an adsorbent can change the pressure of gas that passes through the gas separation film (85) and can adjust the gas separation performance.

According to a ninth aspect based on any one of the first aspect to the eighth aspect, the internal air adjustment device includes a concentration measurement instrument (90) that measures a carbon dioxide concentration and an oxygen concentration inside the storage box (1), and a controller (110) that controls the pressure of the air that is supplied from the air pump (36, 37) by the pressure regulator (39, 46, 66, 48, 68) so as to bring measured values of the concentration measurement instrument close to a predetermined target value of the carbon dioxide concentration and a predetermined target value of the oxygen concentration, to thereby regulate a separation pressure of the gas separation film (85).

In the ninth aspect, by regulating the separation pressure of the gas separation film (85), the controller (110) controls the carbon dioxide concentration and the oxygen concentration in the internal space so as to bring them close to the respective target values.

According to a tenth aspect based on the ninth aspect, when the carbon dioxide concentration inside the storage box (1) is higher than the target value and the oxygen concentration inside the storage box (1) is also higher than the target value, the controller (110) causes the first composition adjustment unit (40) to produce a low oxygen concentration gas having an oxygen concentration that is lower than an oxygen concentration of the external air to supply the low oxygen concentration gas into the storage box (1), and causes a separation pressure of the gas separation film (85) of the second composition adjustment unit (60) to be reduced to reduce a discharge amount of gas that is discharged to the outside of the storage box (1).

In the tenth aspect, as shown in FIG. 9, when the carbon dioxide concentration inside the storage box (1) is higher than the target value and the oxygen concentration is also higher than the target value, the carbon dioxide concentration and the oxygen concentration of the internal air are controlled to be reduced.

According to an eleventh aspect based on the ninth aspect, the second composition adjustment unit (60) is configured to be capable of supplying air whose composition has been adjusted into the storage box (1), and when the carbon dioxide concentration in the storage box (1) is lower than the target value and the oxygen concentration in the storage box (1) is higher than the target value, the controller (110) causes the first composition adjustment unit (40) to produce a low oxygen concentration gas having an oxygen concentration that is lower than an oxygen concentration of the external air to supply the low oxygen concentration gas into the storage box (1), and causes a separation pressure of the gas separation film (85) of the second composition adjustment unit (60) to be increased to increase an amount of the air whose composition has been adjusted and that is returned to the storage box (1).

In the eleventh aspect, as shown in FIG. 9, when the carbon dioxide concentration in the storage box (1) is lower than the target value and the oxygen concentration is higher than the target value, the carbon dioxide concentration of the internal air is controlled to be increased and the oxygen concentration is controlled to be reduced.

According to a twelfth aspect based on the ninth aspect, the second composition adjustment unit (60) is configured to be capable of supplying air whose composition has been adjusted into the storage box (1), and when the carbon dioxide concentration in the storage box (1) is lower than the target value and the oxygen concentration in the storage box (1) is also lower than the target value, the controller (110) causes a high oxygen concentration gas having an oxygen concentration that is higher than an oxygen concentration of the external air produced by the first composition adjustment unit (40) or the external air to be supplied into the storage box (1), and causes a separation pressure of the gas separation film (85) of the second composition adjustment unit (60) to be increased to increase an amount of the air whose composition has been adjusted and that is returned to the storage box (1).

In the twelfth aspect, as shown in FIG. 9, when the carbon dioxide concentration in the storage box (1) is lower than the target value and the oxygen concentration is also lower than the target value, the carbon dioxide concentration and the oxygen concentration of the internal air are controlled to be increased.

According to a thirteenth aspect based on the ninth aspect, when the carbon dioxide concentration in the storage box (1) is higher than the target value and the oxygen concentration in the storage box (1) is lower than the target value, the controller (110) causes an operation in which the external air is supplied into an internal space (1) and a carbon dioxide gas produced by increasing a separation pressure of the gas separation film (85) of the second composition adjustment unit (60) and having a carbon dioxide concentration that is higher than a carbon dioxide concentration of the internal air is discharged into an external space (1), or an operation in which a high oxygen concentration gas produced by the first composition adjustment unit (40) and having an oxygen concentration that is higher than an oxygen concentration of the external air is supplied into the internal space (1), and the separation pressure of the separation film (85) of the second composition adjustment unit (60) is reduced to reduce an amount of air whose composition has been adjusted and that is discharged to the outside of the storage box (1).

In the thirteenth aspect, as shown in FIG. 9, when the carbon dioxide concentration in the storage box (1) is higher than the target value and the oxygen concentration in the storage box (1) is lower than the target value, the carbon dioxide concentration of the internal air is controlled to be reduced and the oxygen concentration is controlled to be increased.

Advantageous Effects of Invention

According to the first aspect of the present disclosure, the pressure of air that is supplied from the air pump (36, 37) to the gas separation film (85) is regulated by the pressure regulator (39, 46, 66). Therefore, even if the gas flow rate of the air pump (36, 37) is constant, it is possible to change the pressure of gas that flows in the gas separation film (85), so that it is possible to adjust the separation performance of the gas separation film (85) in accordance with necessary gas components.

According to the second aspect above, by using as the pressure regulator (46, 66), for example, a pressure regulator including a flow rate adjustment valve or a plurality of on-off valves having different apertures and connected in parallel, a structure that adjusts the separation performance of the gas separation film (85) in accordance with necessary gas components can be easily realized.

According to the third aspect above, by providing the pressure regulator (66) on the downstream side with respect to the separation film (85) of the second composition adjustment unit (60), a structure that adjusts the separation performance of the gas separation film (85) in a path in which air flows to the outside of the storage box from the inside of the storage box can be realized.

According to the fourth aspect above, by providing the pressure regulator (66) on the downstream side with respect to the separation film (85) of the first composition adjustment unit (40) and on the downstream side with respect to the separation film (85) of the second composition adjustment unit (60), a structure that adjusts the separation performance of the gas separation films (85) in a path in which air flows to the inside of the storage box from the outside of the storage box and in a path in which air flows to the outside of the storage box from the inside of the storage box can be realized.

According to the fifth aspect, by providing the pressure regulator (48, 68) on the inflow side where the air flows into the air pump (36, 37), a structure that adjusts the separation performance of the gas separation film (85) by regulating the pressure of the air on the inflow side where the air flows into the air pump (36, 37) can be realized.

According to the sixth aspect, by providing the pressure regulator (48, 68) on the outflow side where the air flows out from the air pump (36, 37), a structure that adjusts the separation performance of the gas separation film (85) by regulating the pressure of the air on the outflow side where the air flows out from the air pump (36, 37) can be realized.

According to the seventh aspect, by changing the discharge amount of the air pump (36, 37) as a result of changing the frequency of electric current by the inverter (39), a structure that adjusts the separation performance of the gas separation film (85) in accordance with necessary gas components can be easily realized.

According to the eighth aspect, in the structure including, in place of the first composition adjustment unit (40) that separates nitrogen and oxygen from the internal air in the storage box (1) by the gas separation film (85) to produce low oxygen concentration gas and high oxygen concentration gas, the adsorption unit (234, 235) that is provided with an adsorbent, a structure that adjusts the gas separation performance by changing the pressure of gas that passes through the gas separation film (85) can be easily realized.

According to the ninth aspect, the carbon dioxide concentration and the oxygen concentration in the internal space can be controlled so as to bring them close to the respective target values by regulating the separation pressure of the gas separation film (85).

According to the tenth aspect, when the carbon dioxide concentration in the storage box (1) is higher than the target value and the oxygen concentration is also higher than the target value, the carbon dioxide concentration and the oxygen concentration of the internal air can both be brought close to their target values by regulating the separation pressure of the gas separation film (85) of the second composition adjustment unit (60) by the pressure regulator (39, 46, 66).

According to the eleventh aspect, when the carbon dioxide concentration in the storage box (1) is lower than the target value and the oxygen concentration is higher than the target value, the carbon dioxide concentration and the oxygen concentration of the internal air can both be brought close to their target values by regulating the separation pressure of the gas separation film (85) of the second composition adjustment unit (60) by the pressure regulator (39, 46, 66).

According to the twelfth aspect, when the carbon dioxide concentration in the storage box (1) is lower than the target value and the oxygen concentration is also lower than the target value, the carbon dioxide concentration and the oxygen concentration of the internal air can both be brought close to their target values by regulating the separation pressure of the gas separation film (85) of the second composition adjustment unit (60) by the pressure regulator (39, 46, 66).

According to the thirteenth aspect, when the carbon dioxide concentration in the storage box (1) is higher than the target value and the oxygen concentration in the storage box (1) is lower than the target value, the carbon dioxide concentration and the oxygen concentration of the internal air can both be brought close to their target values by regulating the separation pressure of the gas separation film (85) of the second composition adjustment unit (60) by the pressure regulator (39, 46, 66).

DESCRIPTION OF EMBODIMENTS

Embodiments are described in detail based on the drawings. Embodiments and modifications that are described below are essentially desirable exemplifications and are not intended to limit applicable objects or the range of use thereof.

First Embodiment

A first embodiment is described. In order to perform a so-called CA (controlled atmosphere) transport, an internal air adjustment device (30) of the present embodiment is provided in a transport container (a storage box) (1). The internal air adjustment device (30) adjusts the composition of air inside (in an internal space of) the transport container (1) so as to differ from the composition of the atmosphere, which is air in outside space.

Figure 1:
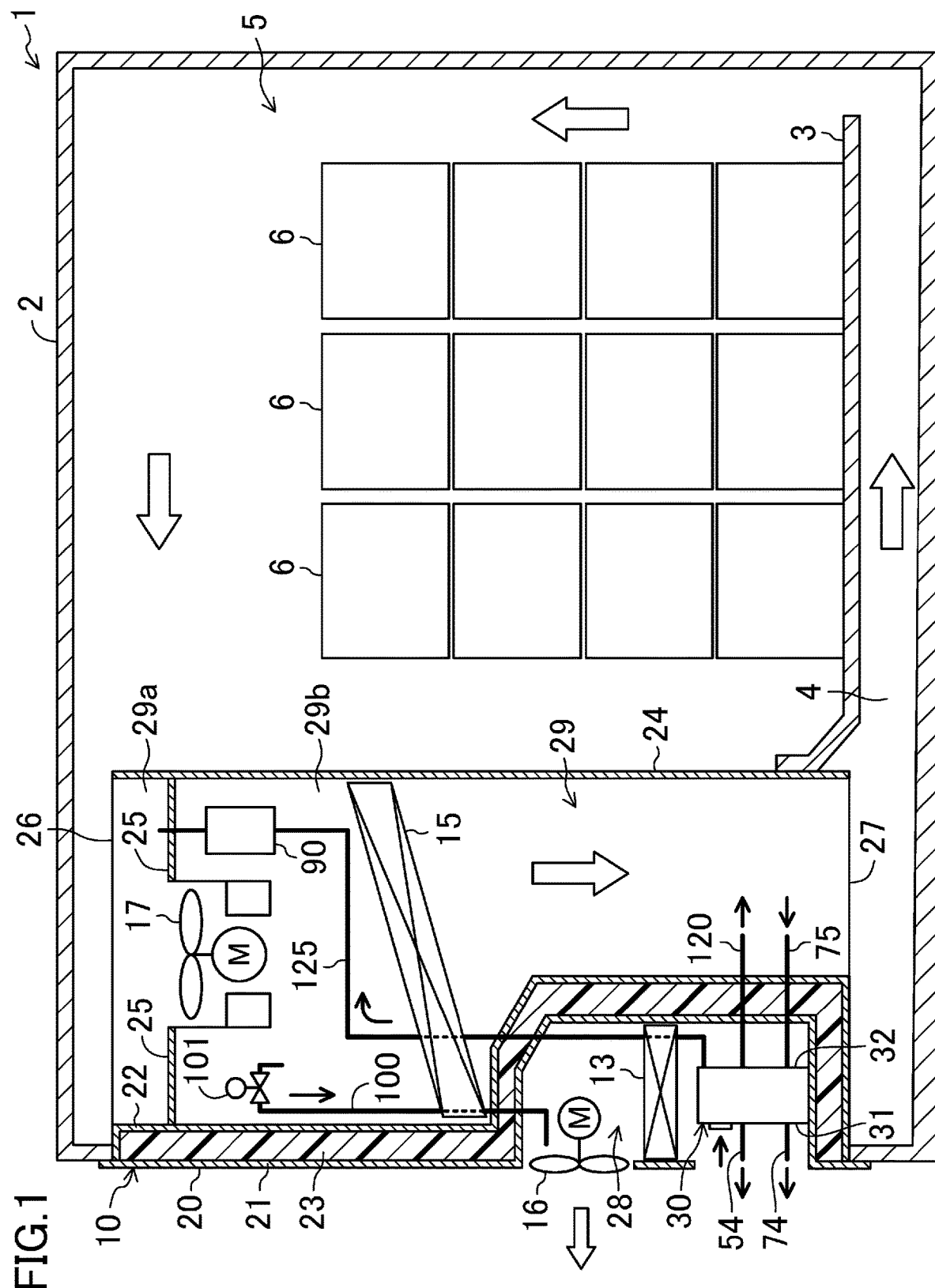
FIG. 1 is a schematic sectional view of a transport container including an internal air adjustment device of a first embodiment.

As shown in FIG. 1, the transport container (1) that constitutes the storage box includes a container main body (2) and a container refrigerator (10). The transport container (1) is a reefer container whose temperature therein is controllable. The internal air adjustment device (30) of the present embodiment is installed in the container refrigerator (10). The transport container (1) is used to transport plants, such as agricultural products, that take in oxygen ($O_2$) in the air and release carbon dioxide ($CO_2$), the plants being transported as goods (6). Examples of plants include fruits, such as bananas and avocados, vegetables, cereals, bulbs, and natural flowers.

The container main body (2) has an elongated rectangular parallelepiped box shape. The container main body (2) has an opening in one end, and the container refrigerator (10) is mounted so as to cover the opening end. An internal space of the container main body (2) constitutes a load room (5) for accommodating the goods (6).

A floor plate (3) for placing the goods (6) thereon is disposed in a bottom portion of the load room (5). An underfloor flow path (4) for allowing air blown out by the container refrigerator (10) to flow therein is formed between the floor plate (3) and a bottom plate of the container main body (2). The underfloor flow path (4) is a flow path extending in a longitudinal direction of the container main body (2) along the bottom plate of the container main body (2). One end of the underfloor flow path (4) is connected to a blow-out port (27) of the container refrigerator (10) and the other end communicates with a space above the floor plate (3) (that is, a space where the goods (6) are accommodated).

—Container Refrigerator—

Figure 2:
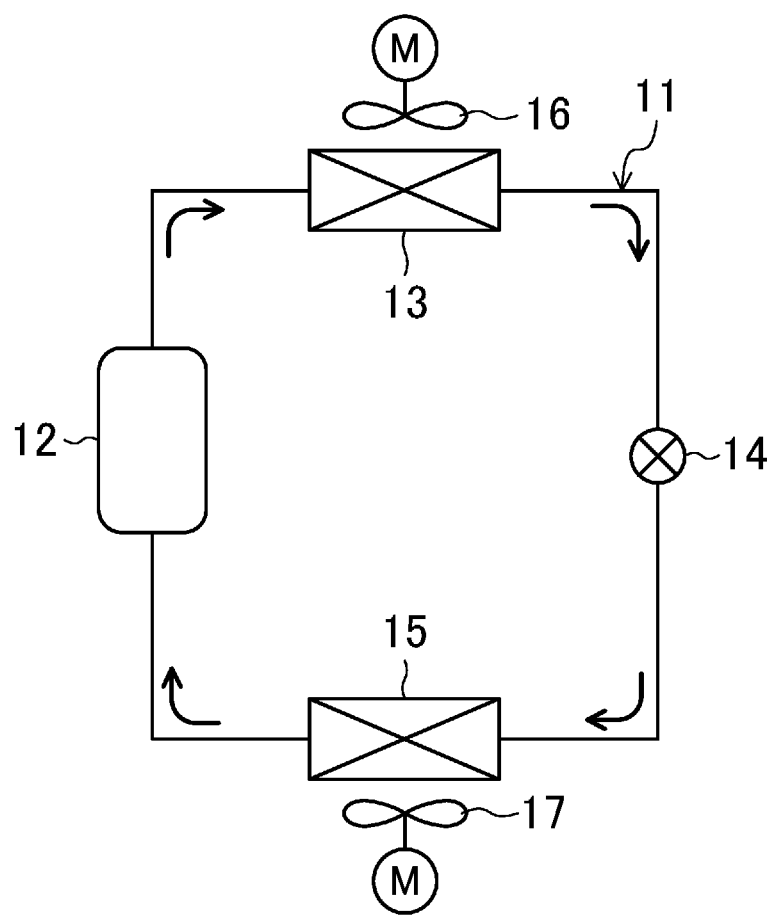
FIG. 2 is a refrigerant circuit diagram showing a structure of a refrigerant circuit of a container refrigerator provided in the transport container.

As shown in FIGS. 1 and 2, the container refrigerator (10) includes a casing (20), a refrigerant circuit (11) that performs a refrigeration cycle, an external fan (16), and an internal fan (17).

The casing (20) includes an external wall portion (21), an internal wall portion (22), a rear plate (24), and a partition plate (25). As described below, the casing (20) is provided with the refrigerant circuit (11), the external fan (16), and the internal fan (17).

The external wall portion (21) is a plate member that is disposed so as to cover the opening end of the container main body (2). A lower portion of the external wall portion (21) bulges toward an inner side of the container main body (2). The internal wall portion (22) is a plate member extending along the external wall portion (21). The internal wall portion (22) is disposed so as to cover a surface of the external wall portion (21) on an inner side of the container main body (2). A heat insulating material (23) fills a space between the external wall portion (21) and the internal wall portion (22).

A lower portion of the casing (20) is recessed toward the inner side of the container main body (2). An external machine room (28) that communicates with the outside space of the transport container (1) is formed at the lower portion of the casing (20). The external fan (16) is disposed in the external machine room (28).

The rear plate (24) is a substantially rectangular plate member. The rear plate (24) is disposed more toward the inner side of the container main body (2) than the internal wall portion (22), and an internal air flow path (29) is formed between the internal wall portion (22) and the rear plate (24). An upper end of the internal air flow path (29) defines an intake port (26) of the casing (20), and a lower end of the internal air flow path (29) defines the blow-out port (27) of the casing (20).

The partition plate (25) is a plate member disposed so as to divide the internal air flow path (29) in an up-and-down direction. The partition plate (25) is disposed in an upper portion of the internal air flow path (29). The partition plate (25) divides the internal air flow path (29) into a primary flow path (29a) above the partition plate (25) and a secondary flow path (29b) below the partition plate (25). The primary flow path (29a) communicates with the load room (5) via the intake port (26). The secondary flow path (29b) communicates with the underfloor flow path (4) via the blow-out port (27). The internal fan (17) is mounted on the partition plate (25). The internal fan (17) is disposed so that air sucked in from the primary flow path (29a) is blown out toward the secondary flow path (29b).

As shown in FIG. 2, the refrigerant circuit (11) is a closed circuit formed by connecting a compressor (12), a condenser (13), an expansion valve (14), and an evaporator (15) to each other by a pipe. When the compressor (12) is operated, a refrigerant circulates in the refrigerant circuit (11) and a vapor compression refrigeration cycle is performed. As shown in FIG. 1, the condenser (13) is disposed on an intake side of the external fan (16) in the external machine room (28), and the evaporator (15) is disposed in the secondary flow path (29b) of the internal air flow path (29). Although not shown in FIG. 1, the compressor (12) is disposed in the external machine room (28).

—Internal Air Adjustment Device—

As shown in FIG. 1, the internal air adjustment device (30) includes a main body unit (31), a sensor unit (a concentration measurement instrument) (90), a ventilation exhaust pipe (100), and a controller (110). The main body unit (31) is installed in the external machine room (28) of the container refrigerator (10). The sensor unit (90) is installed in the internal air flow path (29) of the transport container (1). The ventilation exhaust pipe (100) is installed from the internal air flow path (29) to the external machine room (28) of the transport container (1). The controller (110) is provided in the main body unit (31) and controls structural equipment of the internal air adjustment device (30). The sensor unit (90), the ventilation exhaust pipe (100), and the controller (110) are described in detail below.

Figure 3:
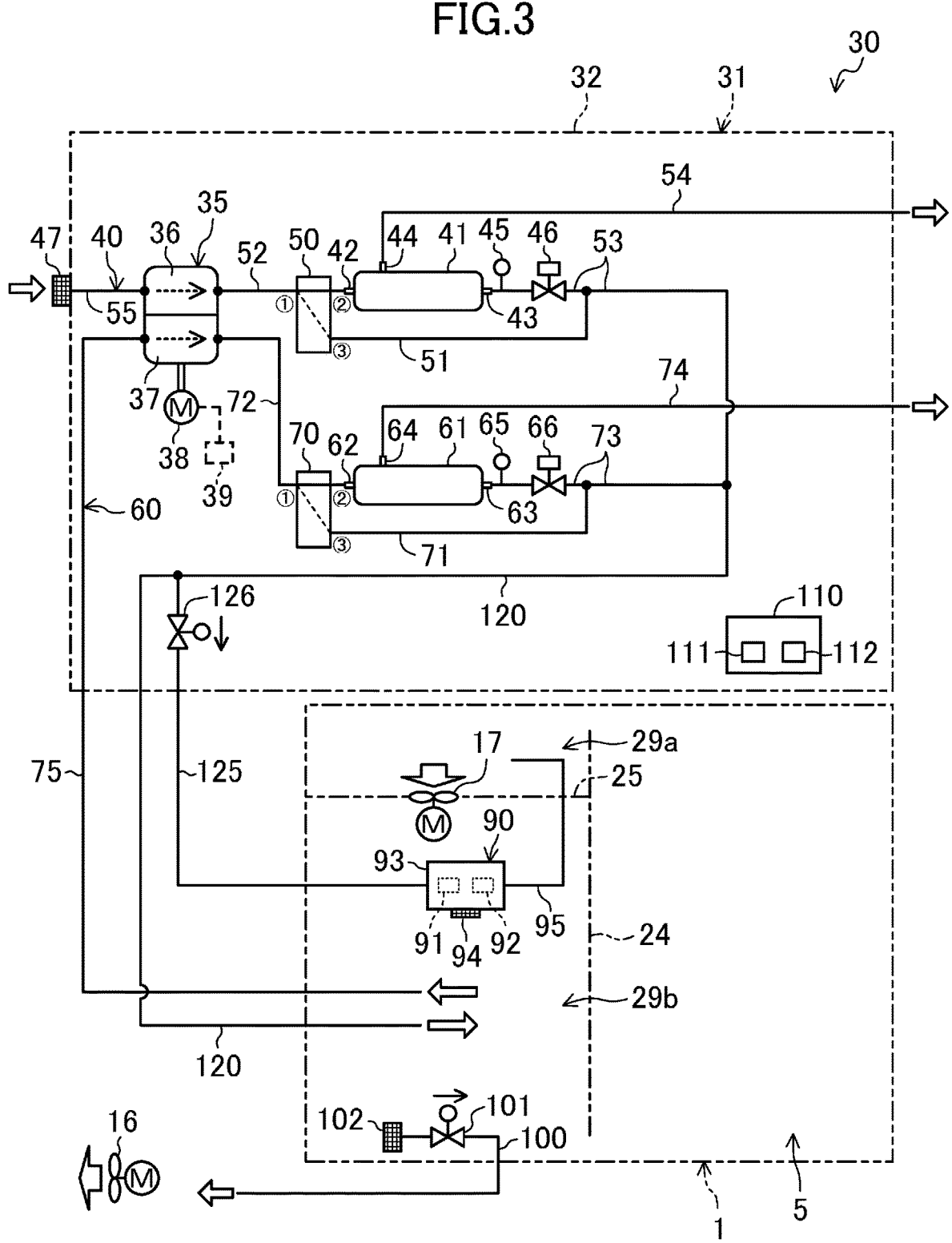
FIG. 3 is a pipe system diagram showing a structure of the internal air adjustment device of the first embodiment.

As shown in FIG. 3, the main body unit (31) of the internal air adjustment device (30) includes a first composition adjustment unit (40), a second composition adjustment unit (60), a pump unit (35), and a unit case (32). The unit case (32) is a hermetically sealed box-shaped container. The first composition adjustment unit (40), the second composition adjustment unit (60), and the pump unit (35) are disposed in an internal space of the unit case (32). The first composition adjustment unit (40), the second composition adjustment unit (60), and the pump unit (35) are described in detail below.

The internal air adjustment device (30) includes a supply pipe (120), an internal-side suction pipe (75), and a measurement pipe (125). The supply pipe (120), the internal-side suction pipe (75), and the measurement pipe (125) are pipes for connecting the main body unit (31) to the internal air flow path (29) of the container refrigerator (10).

The supply pipe (120) is a pipe for supplying air that has flowed out from the first composition adjustment unit (40) and the second composition adjustment unit (60) to the load room (5). An inlet end of the supply pipe (120) is connected to the first composition adjustment unit (40) and the second composition adjustment unit (60), and an outlet end of the supply pipe (120) opens into the secondary flow path (29b) of the internal air flow path (29).

The internal-side suction pipe (75) is a pipe for supplying internal air inside the load room (5) into the second composition adjustment unit (60). An inlet end of the internal-side suction pipe (75) opens into the secondary flow path (29b) of the internal air flow path (29), and an outlet end of the internal-side suction pipe (75) is connected to a second pump (37) of the second composition adjustment unit (60) described later. In the secondary flow path (29b) of the internal air flow path (29), the inlet end of the internal-side suction pipe (75) is disposed on an upstream side of the outlet end of the supply pipe (120).

The measurement pipe (125) is a pipe for supplying air that flows through the supply pipe (120) into the sensor unit (90). An inlet end of the measurement pipe (125) is connected to the supply pipe (120) and an outlet end of the measurement pipe (125) is connected to the sensor unit (90). A measurement on-off valve (126), constituted by an electromagnetic valve, is provided at the measurement pipe (125). The measurement on-off valve (126) is accommodated in the unit case (32) of the main body unit (31).

The ventilation exhaust pipe (100), the supply pipe (120), the internal-side suction pipe (75), the measurement pipe (125), and pipes (51 to 55, 71 to 74, 95) that are provided in a corresponding one of the composition adjustment units (40, 60) described below may be constituted by hard pipes or soft hoses, or may be constituted by a combination of a pipe and a hose. Each of the pipes (53, 55, 73, 75, 120) above is a pipe constituting a gas passage of the present disclosure.

<Pump Unit>

As shown in FIG. 3, the pump unit (35) includes a first pump (an air pump) (36), the second pump (air pump) (37), and a driving motor (38).

The first pump (36) and the second pump (37) are each an air pump that discharges sucked-in air. The first pump (36) and the second pump (37) are each constituted by, for example, a displacement fluid machine. The first pump (36) and the second pump (37) are integrated with each other. The driving motor (38) is an electric motor connected to the first pump (36) and the second pump (37). The driving motor (38) drives both the first pump (36) and the second pump (37).

<First Composition Adjustment Unit>

The first composition adjustment unit (40) is configured to separate external air sucked in from the outside of the transport container (1) (untreated external air) into first external air (low oxygen concentration gas) and second external air (high oxygen concentration gas). The first composition adjustment unit (40) of the present embodiment supplies the first external air, which is supplying air, into the load room (5) and discharges the second external air to the outside of the transport container (1).

The first composition adjustment unit (40) includes an air filter (47), a first separation module (41), a first bypass valve (50), a first pressure sensor (45), and a first adjustment valve (a valve mechanism (a pressure regulator)) (46). The first composition adjustment unit (40) also includes an external-side suction pipe (55), a first introducing pipe (52), a first primary-side pipe (53), a first secondary-side pipe (54), and a first bypass pipe (51). The first pump (36) of the pump unit (35) constitutes the first composition adjustment unit (40).

The air filter (47) is a membrane filter for trapping, for example, dust or salt contained in the external air. The air filter (47) is mounted on the unit case (32) of the main body unit (31). The air filter (47) is connected to a suction port of the first pump (36) via the external-side suction pipe (55). In the internal air adjustment device (30) of the present embodiment, the air filter (47) and the first pump (36) may communicate with each other via the internal space of the unit case (32), which is a hermetically sealed container, without providing the external-side suction pipe (55).

Although described in detail below, the first separation module (41) has a first introducing port (42), a first primary-side guide-out port (43), and a first secondary-side guide-out port (44). The first introducing port (42) is connected to a discharge port of the first pump (36) via the first introducing pipe (52). The first primary-side guide-out port (43) is connected to the supply pipe (120) via the first primary-side pipe (53). One end of the first secondary-side pipe (54) is connected to the first secondary-side guide-out port (44). The first secondary-side pipe (54) extends to the outside of the unit case (32). The other end of the first secondary-side pipe (54) opens to the intake side of the external fan (16) in the external machine room (28).

The first bypass valve (50) is a switching valve having three ports and constitutes a first bypass valve mechanism. The first bypass valve (50) is configured to be switched between a first state in which a first port communicates with a second port and is blocked from a third port (a state shown by a solid line in FIG. 3) and a second state in which the first port communicates with the third port and is blocked from the second port (a state shown by a broken line in FIG. 3).

The first bypass valve (50) is disposed at the first introducing pipe (52). In the first bypass valve (50), the first port is connected to the discharge port of the first pump (36), and the second port is connected to the first introducing port (42) of the first separation module (41). An inlet end of the first bypass pipe (51) is connected to the third port of the first bypass valve (50). An outlet end of the first bypass pipe (51) is connected to the first primary-side pipe (53). The first bypass pipe (51) constitutes a first bypass passage.

The first pressure sensor (45) and the first adjustment valve (46) are provided at the first primary-side pipe (53). The first pressure sensor (45) and the first adjustment valve (46) are disposed closer than the other end of the first bypass pipe (51) that is connected to the first primary-side pipe (53) to the first separation module (41). The first pressure sensor (45) is disposed closer than the first adjustment valve (46) to the first separation module (41).

The first pressure sensor (45) measures the pressure of the first external air that has flowed out from the first primary-side guide-out port (43) of the first separation module (41). The measured value of the first pressure sensor (45) is substantially equal to the pressure of untreated external air that the first pump (36) supplies into the first separation module (41).

The first adjustment valve (46) is an electric valve whose opening degree is changeable and constitutes a first valve mechanism. When the opening degree of the first adjustment valve (46) changes, the pressure of the untreated external air that the first pump (36) supplies into the first separation module (41) changes.

The first separation module (41) constitutes a first separation unit. Although described in detail below, the first separation module (41) includes gas separation films (85). The first separation module (41) separates untreated external air into first external air that did not pass through the gas separation films (85) (air that flows in the first primary-side pipe (53)) and second external air that passed through the gas separation films (85) (air that flows in the first secondary-side pipe (54)).

The first external air has a nitrogen concentration that is higher than that of the untreated external air and an oxygen concentration that is lower than that of the untreated external air. The second external air has a nitrogen concentration that is lower than that of the untreated external air and an oxygen concentration that is higher than that of the untreated external air. In this way, the concentrations of the substances that make up the first external air and the concentrations of the substances that make up the second external air differ from each other. Concentration in the present description means volume ratio.

<Second Composition Adjustment Unit>

The second composition adjustment unit (60) is configured to separate internal air sucked in from the internal space of the transport container (1) (untreated internal air) into first internal air (low oxygen concentration gas) and second internal air (high oxygen concentration gas). The second composition adjustment unit (60) of the present embodiment supplies the first internal air into the load room (5) and discharges the second internal air, which is discharge air, to the outside of the transport container (1).

The second composition adjustment unit (60) includes a second separation module (61), a second bypass valve (70), a second pressure sensor (65), and a second adjustment valve (a valve mechanism (a pressure regulator)) (66). The second composition adjustment unit (60) also includes a second introducing pipe (72), a second primary-side pipe (73), a second secondary-side pipe (74), and a second bypass pipe (71). The second pump (37) of the pump unit (35) constitutes the second composition adjustment unit (60).

Although described in detail below, the second separation module (61) has a second introducing port (62), a second primary-side guide-out port (63), and a second secondary-side guide-out port (64). The second introducing port (62) is connected to a discharge port of the second pump (37) via the second introducing pipe (72). The second primary-side guide-out port (63) is connected to the supply pipe (120) via the second primary-side pipe (73). One end of the second secondary-side pipe (74) is connected to the second secondary-side guide-out port (64). The second secondary-side pipe (74) extends to the outside of the unit case (32). The other end of the second secondary-side pipe (74) opens to the intake side of the external fan (16) in the external machine room (28). The internal-side suction pipe (75) is connected to a suction port of the second pump (37).

The second bypass valve (70) is a switching valve having three ports and constitutes a second bypass valve mechanism. The second bypass valve (70) is configured to be switched between a first state in which a first port communicates with a second port and is blocked from a third port (a state shown by a solid line in FIG. 3) and a second state in which the first port communicates with the third port and is blocked from the second port (a state shown by a broken line in FIG. 3).

The second bypass valve (70) is disposed in the middle of the second introducing pipe (72). In the second bypass valve (70), the first port is connected to the discharge port of the second pump (37), and the second port is connected to the second introducing port (62) of the second separation module (61). An inlet end of the second bypass pipe (71) is connected to the third port of the second bypass valve (70). An outlet end of the second bypass pipe (71) is connected to the second primary-side pipe (73). The second bypass pipe (71) constitutes a second bypass passage.

The second pressure sensor (65) and the second adjustment valve (66) are provided at the second primary-side pipe (73). The second pressure sensor (65) and the second adjustment valve (66) are disposed closer than the other end of the second bypass pipe (71) that is connected to the second primary-side pipe (73) to the second separation module (61). The second pressure sensor (65) is disposed closer than the second adjustment valve (66) to the second separation module (61).

The second pressure sensor (65) measures the pressure of the second external air that has flowed out from the second primary-side guide-out port (63) of the second separation module (61). The measured value of the second pressure sensor (65) is substantially equal to the pressure of untreated internal air that the second pump (37) supplies into the second separation module (61).

The second adjustment valve (66) is an electric valve whose opening degree is changeable and constitutes a second valve mechanism. When the opening degree of the second adjustment valve (66) changes, the pressure of the untreated internal air that the second pump (37) supplies into the second separation module (61) changes.

The second separation module (61) constitutes a second separation unit.

Although described in detail below, the second separation module (61) includes gas separation films (85). The second separation module (61) separates untreated internal air into first internal air that did not pass through the gas separation films (85) (air that flows in the second primary-side pipe (73)) and second internal air that passed through the gas separation films (85) (air that flows in the second secondary-side pipe (74)).

The first internal air has a nitrogen concentration that is higher than that of the untreated internal air and an oxygen concentration and a carbon dioxide concentration that are lower than those of the untreated internal air. The second internal air has a nitrogen concentration that is lower than that of the untreated internal air and an oxygen concentration and a carbon dioxide concentration that are higher than those of the untreated internal air. In this way, the concentrations of the substances that make up the first internal air and the concentrations of the substances that make up the second internal air differ from each other.

<Separation Modules>

Figure 4:
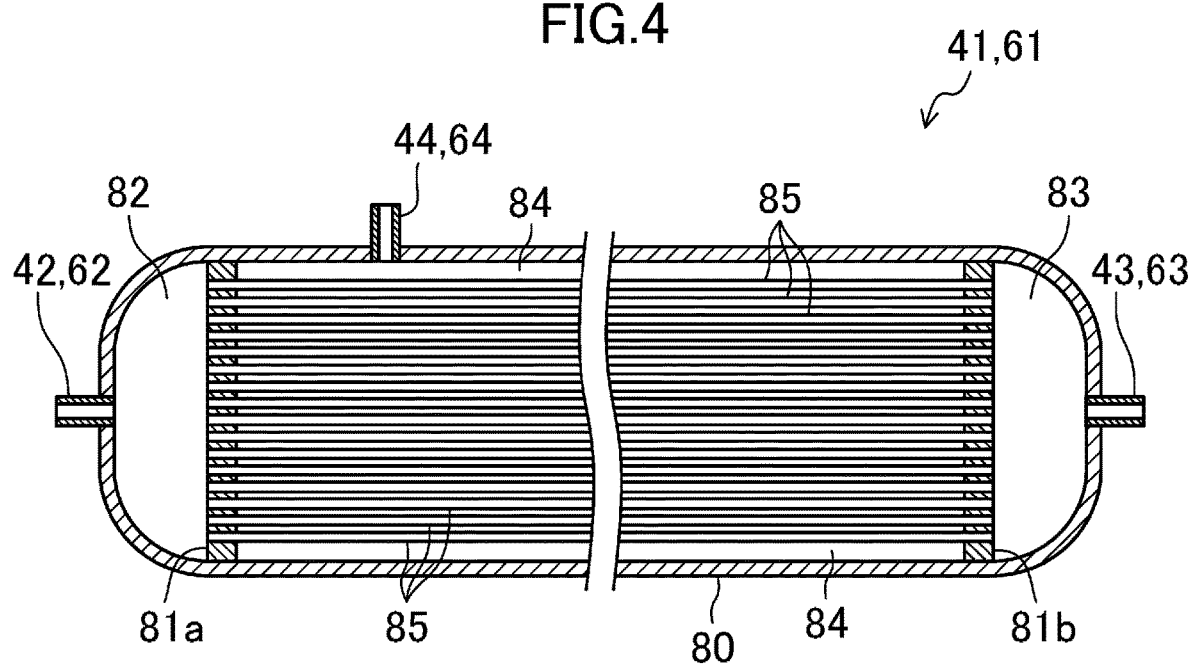
FIG. 4 is a schematic sectional view of a separation module provided in the internal air adjustment device of the first embodiment.

Structures of the first separation module (41) and the second separation module (61) are described with reference to FIG. 4. The structure of the first separation module (41) and the structure of the second separation module (61) are the same.

Each separation module (41, 61) includes one cylindrical case (80) and two partition walls (81*a*, 81*b*). Each cylindrical case (80) is an elongated cylindrical container having both ends closed. Each partition wall (81*a*, 81*b*) is a member for dividing an internal space of the corresponding cylindrical case (80) and is provided so as to traverse the internal space of the corresponding cylindrical case (80). The partition walls (81*a*, 81*b*) are disposed so that one of the partition walls is disposed closer to one end of the internal space of the cylindrical case (80) and the other of the partition walls is disposed closer to the other end of the internal space of the cylindrical case (80). In FIG. 4, the internal space of each cylindrical case (80) is divided into an introducing room (82) that is positioned on the left of the left partition wall (81*a*), a secondary-side guide-out room (84) that is positioned between the two partition walls (81*a*, 81*b*), and a primary-side guide-out room (83) that is positioned on the right of the right partition wall (81*b*).

Each separation module (41, 61) includes the plurality of gas separation films (85) having hollow thread-like shapes (that is, very thin tubular shapes having an outside diameter less than or equal to 1 mm). Each hollow thread-like gas separation film (85) is provided from the one partition wall (81*a*) to the other partition wall (81*b*). One end portion of each gas separation film (85) extends through the one partition wall (81*a*) and opens into the corresponding introducing room (82) and the other end portion of each gas separation film (85) extends through the other partition wall (81*b*) and opens into the corresponding primary-side guide-out room (83). In the internal space of each cylindrical case (80), a portion of a space interposed between the two partition walls (81*a*, 81*b*) on an outer side with respect to the gas separation films (85) constitutes the secondary-side guide-out room (84). In each separation module (41, 61), the introducing room (82) and the primary-side guide-out room (83) communicate with each other via the hollow thread-like gas separation films (85), whereas the secondary-side guide-out room (84) does not communicate with a space on an inner side of each gas separation film (85), the introducing room (82), and the primary-side guide-out room (83).

Each cylindrical case (80) has the introducing port (42, 62), the primary-side guide-out port (43, 63), and the secondary-side guide-out port (44, 64). Each introducing port (42, 62) is disposed in a left end portion of the corresponding cylindrical case (80) in FIG. 4, and communicates with the corresponding introducing room (82). Each primary-side guide-out port (43, 63) is disposed in a right end portion of the corresponding cylindrical case (80) in FIG. 4, and communicates with the corresponding primary-side guide-out room (83). Each secondary-side guide-out port (44, 64) is disposed in an intermediate portion of the corresponding cylindrical case (80) in a longitudinal direction, and communicates with the corresponding secondary-side guide-out room (84).

Each gas separation film (85) is a non-porous polymer film. Each gas separation film (85) separates components contained in mixture gas by making use of the fact that the speeds at which molecules pass through the gas separation films (85) (passing speeds) depend upon substances.

In the internal air adjustment device (30) of the present embodiment, the same gas separation films (85) are provided in each of the first separation module (41) and the second separation module (61). The gas separation films (85) of each separation module (41, 61) have the property that the passing speed of nitrogen is lower than both the passing speed of oxygen and the passing speed of carbon dioxide. The plurality of hollow thread-like gas separation films (85) have substantially the same film thickness. Therefore, the gas separation films (85) that are provided in each separation module (41, 61) have the property that the passing rate of nitrogen is lower than both the passing rate of oxygen and the passing rate of carbon dioxide.

In each separation module (41, 61), air that has flowed into the introducing room (82) via the introducing port (42, 62) flows in the space on the inner side of each hollow thread-like gas separation film (85) toward the primary-side guide-out room (83). A portion of the air that flows in the space on the inner side of each gas separation film (85) passes through the gas separation films (85) and moves toward the secondary-side guide-out room (84), and a remaining portion thereof flows into the primary-side guide-out room (83).

The gas separation films (85) of each separation module (41, 61) have a nitrogen passing rate that is lower than the oxygen passing rate and the carbon dioxide passing rate. That is, nitrogen is less likely to pass through the gas separation films (85) than oxygen and carbon dioxide. Therefore, air that flows on the inner side of each hollow thread-like gas separation film (85) is such that, with decreasing distance from each primary-side guide-out room (83), at the same time that the nitrogen concentration increases, the oxygen concentration and the carbon dioxide concentration decrease. The oxygen and carbon dioxide contained in the air that flows in the hollow thread-like gas separation films (85) pass through the gas separation films (85) and move toward the corresponding secondary-side guide-out rooms (84).

As a result, air that has flowed into each primary-side guide-out room (83) without passing through the gas separation films (85) has a nitrogen concentration that is higher than that of air in the corresponding introducing room (82)

and has an oxygen concentration and a carbon dioxide concentration that are lower than those of the air in the corresponding introducing room (82). Air that has passed through the gas separation films (85) and moved to the corresponding secondary-side guide-out room (84) has a nitrogen concentration that is lower than that of air in the corresponding introducing room (82) and has an oxygen concentration and a carbon dioxide concentration that are higher than those of the air in the corresponding introducing room (82).

In the first separation module (41), untreated external air flows into the introducing room (82) from the first introducing port (42), air that has flowed into the first primary-side guide-out room (83) without passing through the gas separation films (85) flows out from the first primary-side guide-out port (43) as first external air, and air that has passed through the gas separation films (85) and flowed into the secondary-side guide-out room (84) flows out from the first secondary-side guide-out port (44) as second external air. On the other hand, in the second separation module (61), untreated internal air flows into the introducing room (82) from the second introducing port (62), air that has flowed into the primary-side guide-out room (83) without passing through the gas separation films (85) flows out from the second primary-side guide-out port (63) as first internal air, and air that has passed through the gas separation films (85) and flowed into the secondary-side guide-out room (84) flows out from the second secondary-side guide-out port (64) as second internal air.

<Sensor Unit>

As shown in FIGS. 1 and 3, the sensor unit (90) is disposed in the secondary flow path (29b) of the internal air flow path (29) of the container refrigerator (10). As shown in FIG. 3, the sensor unit (90) includes an oxygen sensor (91), a carbon dioxide sensor (92), and a sensor case (93).

The oxygen sensor (91) is a zirconia current sensor that measures the oxygen concentration of mixture gas, such as air. The carbon dioxide sensor (92) is a nondispersive infrared (NDIR) sensor that measures the carbon dioxide concentration of mixture gas, such as air. The oxygen sensor (91) and the carbon dioxide sensor (92) are accommodated in the sensor case (93).

The sensor case (93) is a slightly elongated box-shaped member. The outlet end of the measurement pipe (125) is connected to one end portion of the sensor case (93) in a longitudinal direction, and one end of the outlet pipe (95) is connected to the other end portion of the sensor case (93). The other end of the outlet pipe (95) opens into the primary flow path (29a) of the internal air flow path (29). An air filter (94) for allowing the internal air that flows through the internal air flow path (29) to be introduced into an internal space of the sensor case (93) is mounted on the sensor case (93). The air filter (94) is a membrane filter for trapping, for example, dust that is contained in the internal air.

As described below, when the internal fan (17) is operating, the air pressure in the secondary flow path (29b) becomes slightly higher than the air pressure in the primary flow path (29a). Therefore, in a state in which the measurement on-off valve (126) is closed, internal air in the secondary flow path (29b) flows into the sensor case (93) via the air filter (94) and, then, passes through the outlet pipe (95) and flows into the primary flow path (29a). In this state, in the sensor unit (90), the oxygen sensor (91) measures the oxygen concentration of the internal air, and the carbon dioxide sensor (92) measures the carbon dioxide concentration of the internal air.

<Ventilation Exhaust Pipe>

The ventilation exhaust pipe (100) is a pipe for connecting the inside and the outside of the transport container (1). The ventilation exhaust pipe (100) constitutes a ventilation exhaust passage. As shown in FIG. 1, the ventilation exhaust pipe (100) extends through the casing (20) of the container refrigerator (10). One end of the ventilation exhaust pipe (100) opens into the secondary flow path (29b) of the internal air flow path (29). The other end of the ventilation exhaust pipe (100) opens to a suction side of the external fan (16) in the external machine room (28).

As shown in FIG. 3, an air filter (102) is mounted on one end of the ventilation exhaust pipe (100). The air filter (102) is a membrane filter for trapping, for example, dust that is contained in the internal air. A ventilation exhaust valve (101) is provided at the ventilation exhaust pipe (100). The ventilation exhaust valve (101) is an on-off valve that is constituted by an electromagnetic valve.

<Controller>

The controller (110) includes a CPU (111) that performs a controlling operation and a memory (112) that stores, for example, data required for the controlling operation. Measured values of the oxygen sensor (91), the carbon dioxide sensor (92), the first pressure sensor (45), and the second pressure sensor (65) are input to the controller (110). The controller (110) performs a controlling operation for operating the pump unit (35), the first adjustment valve (46), the second adjustment valve (66), the first bypass valve (50), the second bypass valve (70), and the ventilation exhaust valve (101).

—Operation of Container Refrigerator—

The container refrigerator (10) operates to cool internal air in the transport container (1).

In the cooling operation, the compressor (12) of the refrigerant circuit (11) operates and a refrigerant circulates in the refrigerant circuit (11) to perform a vapor compression refrigeration cycle. In the refrigerant circuit (11), a refrigerant discharged from the compressor (12) moves through the condenser (13), the expansion valve (14), and the evaporator (15) in this order, and is subsequently sucked into the compressor (12) and compressed.

In the cooling operation, the external fan (16) and the internal fan (17) operate. When the external fan (16) operates, external air that exists outside the transport container (1) is sucked into the external machine room (28) and moves through the condenser (13). In the condenser (13), a refrigerant dissipates heat to the external air and is condensed. When the internal fan (17) operates, internal air inside the load room (5) of the transport container (1) is sucked into the internal air flow path (29) and moves through the evaporator (15). In the evaporator (15), a refrigerant absorbs heat from the internal air and evaporates.

A flow of the internal air is described. The internal air that exists in the load room (5) flows into the primary flow path (29a) of the internal air flow path (29) via the intake port (26) and is blown out into the secondary flow path (29b) by the internal fan (17). The internal air that has flowed into the secondary flow path (29b) is cooled while moving through the evaporator (15), and is then blown out into the underfloor flow path (4) from the blow-out port (27) and flows into the load room (5) via the underfloor flow path (4).

In the internal air flow path (29), the primary flow path (29a) is positioned on an intake side of the internal fan (17) and the secondary flow path (29b) is positioned on a blow-out side of the internal fan (17). Therefore, during the operation of the internal fan (17), the air pressure of the secondary flow path (29b) is slightly higher than the air pressure of the primary flow path (29a).

—Operation of Internal Air Adjustment Device—

The internal air adjustment device (30) operates to adjust the composition of internal air (in the present embodiment, the oxygen concentration and the carbon dioxide concentration of the internal air) inside the load room (5) of the transport container (1). Here, the operation of the internal air adjustment device (30) of the present embodiment is described by using as an example a case in which a target range of the oxygen concentration of the internal air is 5%±1% and a target range of the carbon dioxide concentration of the internal air is 2%±1%.

<Outline of Operation of Internal Air Adjustment Device>

The internal air adjustment device (30) of the present embodiment performs an oxygen concentration reduction operation for reducing the oxygen concentration of the internal air inside the load room (5), a carbon dioxide concentration reduction operation for reducing the carbon dioxide concentration of the internal air inside the load room (5), and an oxygen concentration increasing operation for increasing the oxygen concentration of the internal air inside the load room (5).

At the time the loading of the goods (6) into the transport container (1) is completed, the composition of the internal air that exists inside the load room (5) is substantially the same as the composition of the atmosphere (nitrogen concentration: 78%, oxygen concentration: 21%, carbon dioxide concentration: 0.04%). Here, the internal air adjustment device (30) performs the oxygen concentration reduction operation for reducing the oxygen concentration of the internal air. When the oxygen concentration of the internal air reaches an upper limit value (6%) of the target range, the internal air adjustment device (30) stops the oxygen concentration reduction operation.

After the oxygen concentration of the internal air has reached 6% and an oxygen concentration reduction operation of the internal air adjustment device (30) has stopped, since plants, which are the goods (6), respire, at the same time that the oxygen concentration of the internal air is gradually reduced, the carbon dioxide concentration of the internal air is gradually increased.

When the carbon dioxide concentration of the internal air reaches an upper limit value (3%) of the target range, the internal air adjustment device (30) performs the carbon dioxide concentration reduction operation for reducing the carbon dioxide concentration of the internal air. When the carbon dioxide concentration of the internal air reaches a lower limit value of the target range (1%), the internal air adjustment device (30) stops the carbon dioxide concentration reduction operation.

When the oxygen concentration of the internal air reaches a lower limit value (4%) of the target range, the internal air adjustment device (30) performs the oxygen concentration increasing operation for increasing the oxygen concentration of the internal air. When the oxygen concentration of the internal air reaches the upper limit value (6%) of the target range, the internal air adjustment device (30) stops the oxygen concentration increasing operation.

In this way, in order to reduce the oxygen concentration of the internal air inside the load room (5) to the target range from 21% (the oxygen concentration of the atmosphere), the internal air adjustment device (30) performs the oxygen concentration reduction operation. In order to maintain the oxygen concentration and the carbon dioxide concentration of the internal air inside the load room (5) in their respective target ranges, the internal air adjustment device (30) repeats the carbon dioxide reduction operation and the oxygen concentration increasing operation as appropriate.

<Oxygen Concentration Reduction Operation>

The oxygen concentration reduction operation of the internal air adjustment device (30) is described with reference to FIGS. 3 to 5 as appropriate. In the oxygen concentration reduction operation, the first composition adjustment unit (40) supplies first external air having a low oxygen concentration into the load room (5), and the second composition adjustment unit (60) supplies first internal air having a low oxygen concentration into the load room (5).

In the oxygen concentration reduction operation, the controller (110) sets the first bypass valve (50) and the second bypass valve (70) to the respective first states (the states shown by the solid lines in FIG. 3), operates the first pump (36) and the second pump (37) by passing electric current through the driving motor (38) of the pump unit (35), and sets the ventilation exhaust valve (101) in an open state.

First, when the first pump (36) operates, external air that exists outside the transport container (1) moves through the air filter (47) and the external-side suction pipe (55) and is sucked into the first pump (36). The first pump (36) compresses and discharges the sucked-in external air. The pressure of the external air that is discharged by the first pump (36) is approximately twice the atmospheric pressure. The external air discharged from the first pump (36) flows in the first introducing pipe (52) and flows into the first introducing port (42) of the first separation module (41) as untreated external air.

In the first separation module (41), the untreated external air that has passed through the first introducing port (42) and flowed into the introducing room (82) flows into the hollow thread-like gas separation films (85). A portion of the air that flows along the inner side of each hollow thread-like gas separation film (85) moves through the gas separation films (85) and moves toward the secondary-side guide-out room (84) as second external air, and a remaining portion thereof flows into the primary-side guide-out room (83) as first external air. As described above, the gas separation films (85) have the property that the passing rate of nitrogen is lower than the passing rate of oxygen. Therefore, as shown in FIG. 5, the oxygen concentration of the first external air is lower than the oxygen concentration of the untreated external air, and the oxygen concentration of the second external air is higher than the oxygen concentration of the untreated external air.

The first external air that has flowed out into the first primary-side pipe (53) from the first primary-side guide-out port (43) of the first separation module (41) flows into the supply pipe (120). On the other hand, the second external air that has flowed out into the first secondary-side pipe (54) from the first secondary-side guide-out port (44) of the first separation module (41) is discharged to the outside of the transport container (1).

Next, when the second pump (37) is operated, internal air that exists inside the transport container (1) (specifically, internal air that exists in the secondary flow path (29b) of the container refrigerator (10)) moves through the internal-side suction pipe (75) and is sucked into the second pump (37). The second pump (37) compresses and discharges the sucked-in internal air. The pressure of the external air that is discharged by the second pump (37) is substantially slightly higher than the atmospheric pressure. The internal air discharged from the second pump (37) flows into the second introducing pipe (72) and flows into the second introducing port (62) of the second separation module (61) as untreated internal air.

In the second separation module (61), the untreated internal air that has moved through the second introducing port (62) and flowed into the introducing room (82) flows into the hollow thread-like gas separation films (85). A portion of air that flows along the inner side of each hollow thread-like gas separation film (85) passes through the gas separation films (85) and moves toward the secondary-side guide-out room (84) as second external air, and a remaining portion thereof flows into the primary-side guide-out room (83) as first internal air. As described above, the gas separation films (85) have the property that the passing rate of nitrogen is lower than the passing rate of oxygen. Therefore, as shown in FIG. 5, the oxygen concentration of the first internal air is lower than the oxygen concentration of the untreated internal air, and the oxygen concentration of the second internal air is higher than the oxygen concentration of the untreated internal air.

The first internal air that has flowed out into the second primary-side pipe (73) from the second primary-side guide-out port (63) of the second separation module (61) flows into the supply pipe (120). On the other hand, the second internal air that has flowed out into the second secondary-side pipe (74) from the second secondary-side guide-out port (64) of the second separation module (61) is discharged to the outside of the transport container (1).

As described above, the first external air that has flowed out from the first separation module (41) and the first internal air that has flowed out from the second separation module (61) flow into the supply pipe (120). Mixed air containing the first external air and the first internal air that flow through the supply pipe (120) flows into the secondary flow path (29*b*) of the container refrigerator (10) and is supplied into the load room (5) along with the air that flows through the secondary flow path (29*b*).

Figure 5:
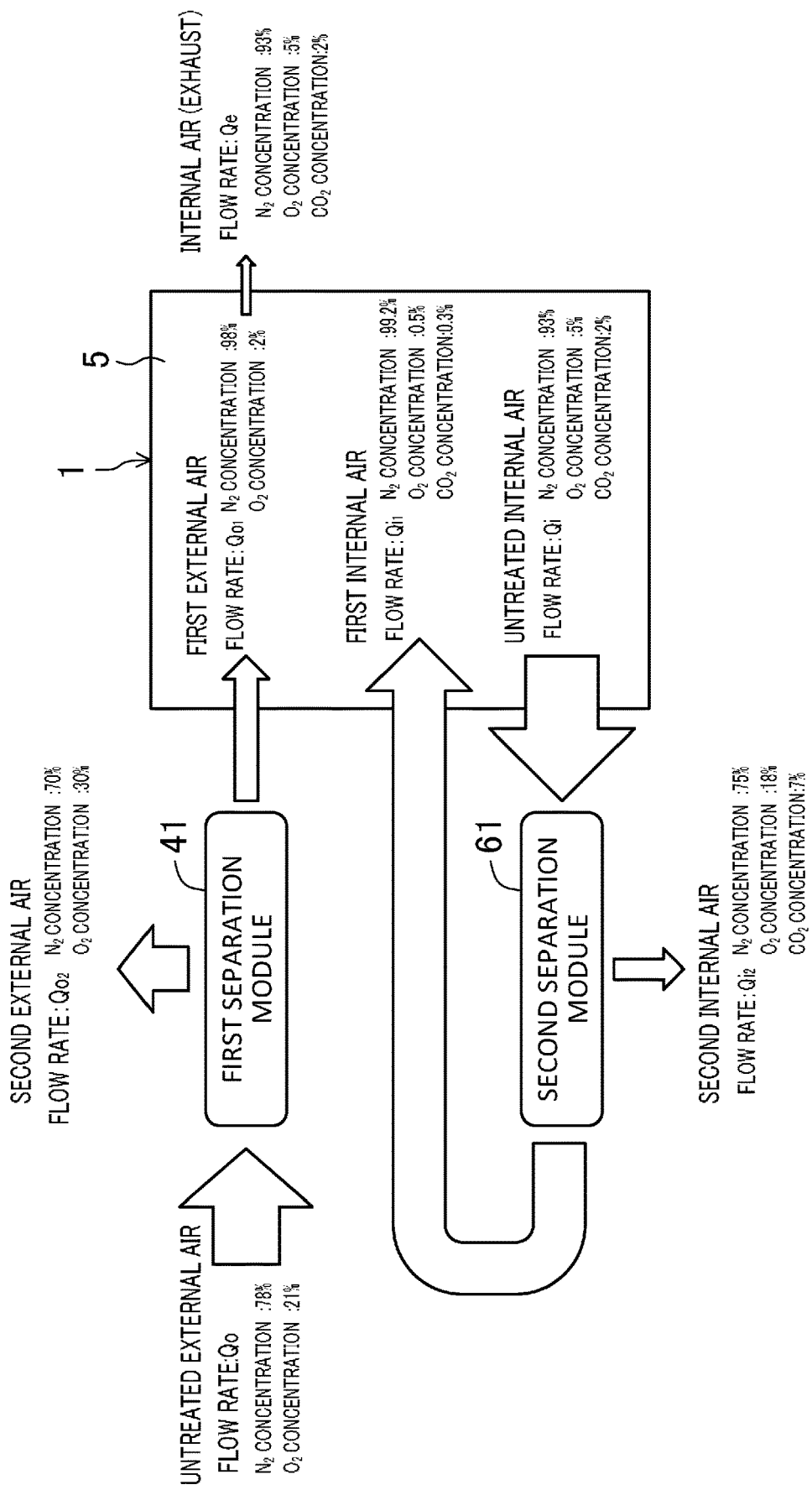
FIG. 5 is a block diagram showing an oxygen concentration reduction operation that is performed by the internal air adjustment device of the first embodiment.

Ordinarily, during the oxygen concentration reduction operation, a flow rate $Q_{o1}$ of the first external air that is supplied into the transport container (1) from the outside of the transport container (1) is higher than a flow rate $Q_{i2}$ of the second internal air that is discharged to the outside from the inside of the transport container (1) ($Q_{o1} > Q_{i2}$), and the air pressure inside the transport container (1) becomes a positive pressure (refer to FIG. 5). That is, the first composition adjustment unit (40) supplies the first external air into the transport container (1) so that the air pressure inside the transport container (1) becomes a positive pressure. Since the air pressure inside the transport container (1) becomes a positive pressure, a portion of the internal air moves through the ventilation exhaust pipe (100) and is discharged to the outside of the transport container (1).

In this way, in the oxygen concentration reduction operation, at the same time that the first external air having an oxygen concentration that is lower than the oxygen concentration of the atmosphere is supplied, the internal air inside the load room (5) is discharged to the outside of the transport container (1) via the ventilation exhaust pipe (100), and the oxygen concentration of the internal air inside the load room (5) is reduced. In the oxygen concentration reduction operation, by discharging the second internal air having a high oxygen concentration and separated from the untreated internal air to the outside of the transport container (1), the oxygen concentration of the internal air inside the load room (5) is reduced.

<Carbon Dioxide Concentration Reduction Operation>

The carbon dioxide concentration reduction operation of the internal air adjustment device (30) is described with reference to FIGS. 3, 4, and 6 as appropriate. In the carbon dioxide concentration reduction operation, the first composition adjustment unit (40) supplies first external air having a low oxygen concentration into the load room (5), and the second composition adjustment unit (60) supplies first internal air having a low carbon dioxide concentration into the load room (5).

In the carbon dioxide concentration reduction operation, the controller (110) sets the first bypass valve (50) and the second bypass valve (70) to the respective first states (the states shown by the solid lines in FIG. 3), operates the first pump (36) and the second pump (37) by passing electric current through the driving motor (38) of the pump unit (35), and sets the ventilation exhaust valve (101) in an open state and the measurement on-off valve (126) in a closed state. The flow of air through each of the first composition adjustment unit (40) and the second composition adjustment unit (60) is the same as the flow of air when the oxygen concentration reduction operation is performed. However, in the carbon dioxide concentration reduction operation, the pressure of the external air that is discharged by the first pump (36) and the pressure of the internal air that is discharged by the second pump (37) are substantially slightly higher than the atmospheric pressure.

In the first composition adjustment unit (40), untreated external air that has flowed into the first separation module (41) is separated into first external air having a nitrogen concentration that is higher than the nitrogen concentration of the untreated external air and an oxygen concentration that is lower than the oxygen concentration of the untreated external air and second external air having a nitrogen concentration that is lower than the nitrogen concentration of the untreated external air and an oxygen concentration that is higher than the oxygen concentration of the untreated external air. The first external air is supplied into the transport container (1) and the second external air is discharged to the outside of the transport container (1). The carbon dioxide concentration of the untreated external air is substantially the same as the carbon dioxide concentration (0.04%) of the atmosphere. Therefore, the carbon dioxide concentration of the first external air can be considered as being substantially zero.

In the second composition adjustment unit (60), untreated internal air that has flowed into the second separation module (61) is separated into first internal air having a nitrogen concentration that is higher than the nitrogen concentration of the untreated internal air and an oxygen concentration and a carbon dioxide concentration that are lower than the oxygen concentration and the carbon dioxide concentration of the untreated internal air and second internal air having a nitrogen concentration that is lower than the nitrogen concentration of the untreated internal air and an oxygen concentration and a carbon dioxide concentration that are higher than the oxygen concentration and the carbon dioxide concentration of the untreated internal air. Then, the first internal air is supplied into the transport container (1) and the second internal air is discharged to the outside of the transport container (1).

Figure 6:
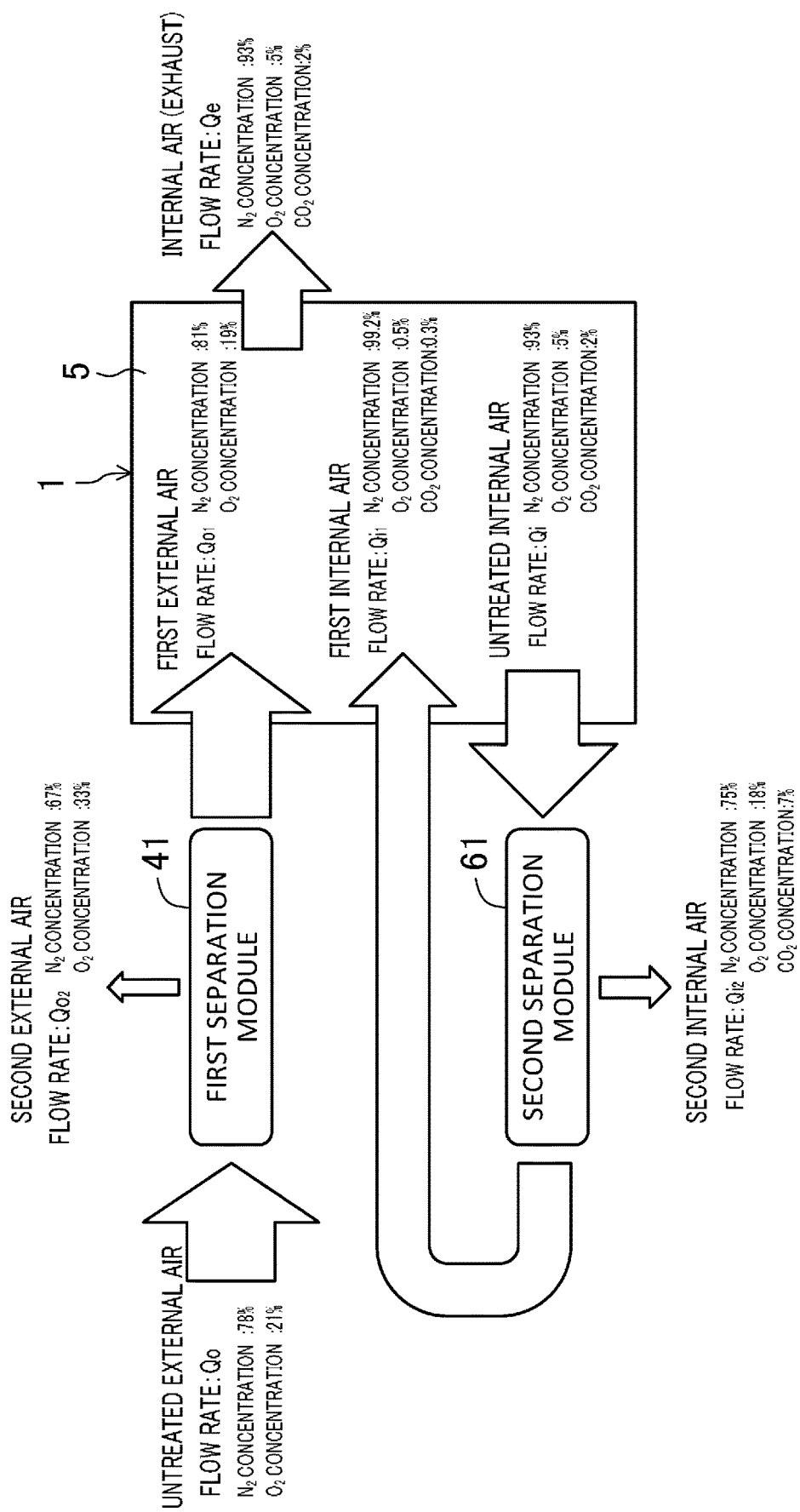
FIG. 6 is a block diagram showing a carbon dioxide concentration reduction operation that is performed by the internal air adjustment device of the first embodiment.

Ordinarily, when the carbon dioxide concentration reduction operation is being performed, similarly to when the oxygen concentration reduction operation is performed, a flow rate $Q_{o1}$ of the first external air is higher than a flow rate $Q_{i2}$ of the second internal air ($Q_{o1} > Q_{i2}$), and the air pressure inside the transport container (1) becomes a positive pressure (refer to FIG. 6). That is, the first composition adjustment unit (40) supplies the first external air into the transport container (1) so that the air pressure inside the transport container (1) becomes a positive pressure. Since the air pressure inside the transport container (1) becomes a positive pressure, a portion of the internal air inside the load room (5) moves through the ventilation exhaust pipe (100) and is discharged to the outside of the transport container (1).

In this way, in the carbon dioxide concentration reduction operation, at the same time that the first external air having a very low carbon dioxide concentration is supplied, the internal air is discharged to the outside of the transport container (1) via the ventilation exhaust pipe (100), and the carbon dioxide concentration of the internal air inside the load room (5) is reduced. In the carbon dioxide concentration reduction operation, by discharging the second internal air having a high carbon dioxide concentration and separated from the untreated internal air to the outside of the transport container (1), the carbon dioxide concentration of the internal air inside the load room (5) is reduced.

<Oxygen Concentration Increasing Operation>

The oxygen concentration increasing operation of the internal air adjustment device (30) is described with reference to FIG. 3. In the oxygen concentration increasing operation, external air sucked in by the first composition adjustment unit (40) from the outside of the transport container (1) is supplied as it is into the load room (5), and the second composition adjustment unit (60) sends back internal air sucked in by the second composition adjustment unit (60) from the inside of the transport container (1) as it is into the load room (5).

In the oxygen concentration increasing operation, the controller (110) sets the first bypass valve (50) and the second bypass valve (70) to the respective second states (the states shown by the broken lines in FIG. 3), operates the first pump (36) and the second pump (37) by passing electric current through the driving motor (38) of the pump unit (35), and sets the ventilation exhaust valve (101) in an open state and the measurement on-off valve (126) in a closed state.

In the first composition adjustment unit (40), external air discharged from the first pump (36) flows into the first bypass pipe (51) and, with its nitrogen concentration and oxygen concentration maintained, the external air flows into the first primary-side pipe (53) and then moves through the supply pipe (120) and is supplied into the transport container (1). On the other hand, in the second composition adjustment unit (60), after internal air sucked into the second pump (37) has been discharged from the second pump (37), the internal air moves through the second bypass pipe (71) and flows into the second primary-side pipe (73), and then moves through the supply pipe (120) and returns to the inside of the transport container (1). A portion of the internal air inside the load room (5) moves through the ventilation exhaust pipe (100) and is discharged to the outside of the transport container (1).

In this way, in the oxygen concentration increasing operation, by supplying the external air having an oxygen concentration that is higher than the oxygen concentration of the internal air into the transport container (1), the oxygen concentration inside the load room (5) is increased.

—Controlling Operation of Controller—

The controller (110) of the internal air adjustment device (30) monitors the measured values of the oxygen sensor (91) and the carbon dioxide sensor (92). When the internal air adjustment device (30) operates as described above, the controller (110) controls the structural equipment of the internal air adjustment device (30) based on the measured values of the oxygen sensor (91) and the carbon dioxide sensor (92) so as to maintain the oxygen concentration and the carbon dioxide concentration of the internal air in their respective target ranges.

In a general internal air adjustment device in the related art, in order to discharge internal air out from the container (1) through the gas separation films and to introduce outside air into the transport container (1), air pumps having constant rotational speeds and constant gas flow rates are used and the pump pressures are constant. Therefore, the separation performance of the gas separation films cannot be adjusted in accordance with necessary gas components. In the present embodiment, as pressure regulators (valve mechanisms), the first adjustment valve (46) and the second adjustment valve (66) are provided between the air pumps (36, 37) and the gas separation films (85) of the corresponding first and second separation modules (41, 61) (the corresponding first and second composition adjustment units (40, 60)), and the pressure of air that is supplied into the gas separation films (85) can be controlled by the controller (110) above by regulating them.

<Pressure Regulation Operation>

First, as a typical example of a pressure regulation operation, an operation of adjusting the oxygen concentration is described.

The oxygen concentration in the internal space of the transport container (1) is detected by the oxygen sensor (91). When the oxygen concentration in the internal space deviates from a target value, the controller (110) regulates the pressure to maintain the oxygen concentration at the target value.

Here, the pressure of air that moves through the gas separation films (85) is detected by the first pressure sensor (45) and the second pressure sensor (65), and the detected values are input to the controller (110). By calculation or based on a data table stored in the memory, the controller (110) determines the oxygen concentration of the first external air having a low oxygen concentration that has flowed out from the first primary-side guide-out port (43) of the first separation module (41) and the oxygen concentration of the first internal air having a low oxygen concentration that has flowed out from the second primary-side guide-out port (63) of the second separation module (61), the oxygen concentrations being in accordance with the detected pressures.

When it is determined that the required separation performance cannot be obtained with the determined oxygen concentrations, the controller (110) controls the opening degree of the first adjustment valve (46) and the second adjustment valve (66) to obtain the required separation performance. For example, when the oxygen concentration of the first external air is higher than the target value, the first adjustment valve (46) is throttled to reduce the oxygen concentration of the first external air. When the oxygen concentration of the first internal air is higher than the target value, the second adjustment valve (66) is throttled to reduce the oxygen concentration of the first internal air.

The controlling operation above can be similarly performed for the carbon dioxide concentration of the first external air and the carbon dioxide concentration of the first internal air.

In this way, in the present embodiment, by performing the controlling operation to adjust the opening degree of the first adjustment valve (46) and the opening degree of the second adjustment valve (66) and to regulate the pressure of air that is supplied into the gas separation films (85), the oxygen concentration and the carbon dioxide concentration of the air that is supplied into the internal space of the transport container (1) are adjusted.

—Details of Pressure Regulation Operation—

As described above, the embodiment features the sensor unit (90), which is a concentration measurement instrument, that measures the carbon dioxide concentration and the oxygen concentration inside the transport container (1). By using the first adjustment valve (46) and the second adjustment valve (66), which are pressure regulators, the controller controls the pressure of air supplied from the air pumps (36, 37) so as to bring the measured values of the sensor unit (90) close to a predetermined target value of the carbon dioxide concentration and a predetermined target value of the oxygen concentration, to thereby regulate the separation pressure of the gas separation films (85).

Figure 9:
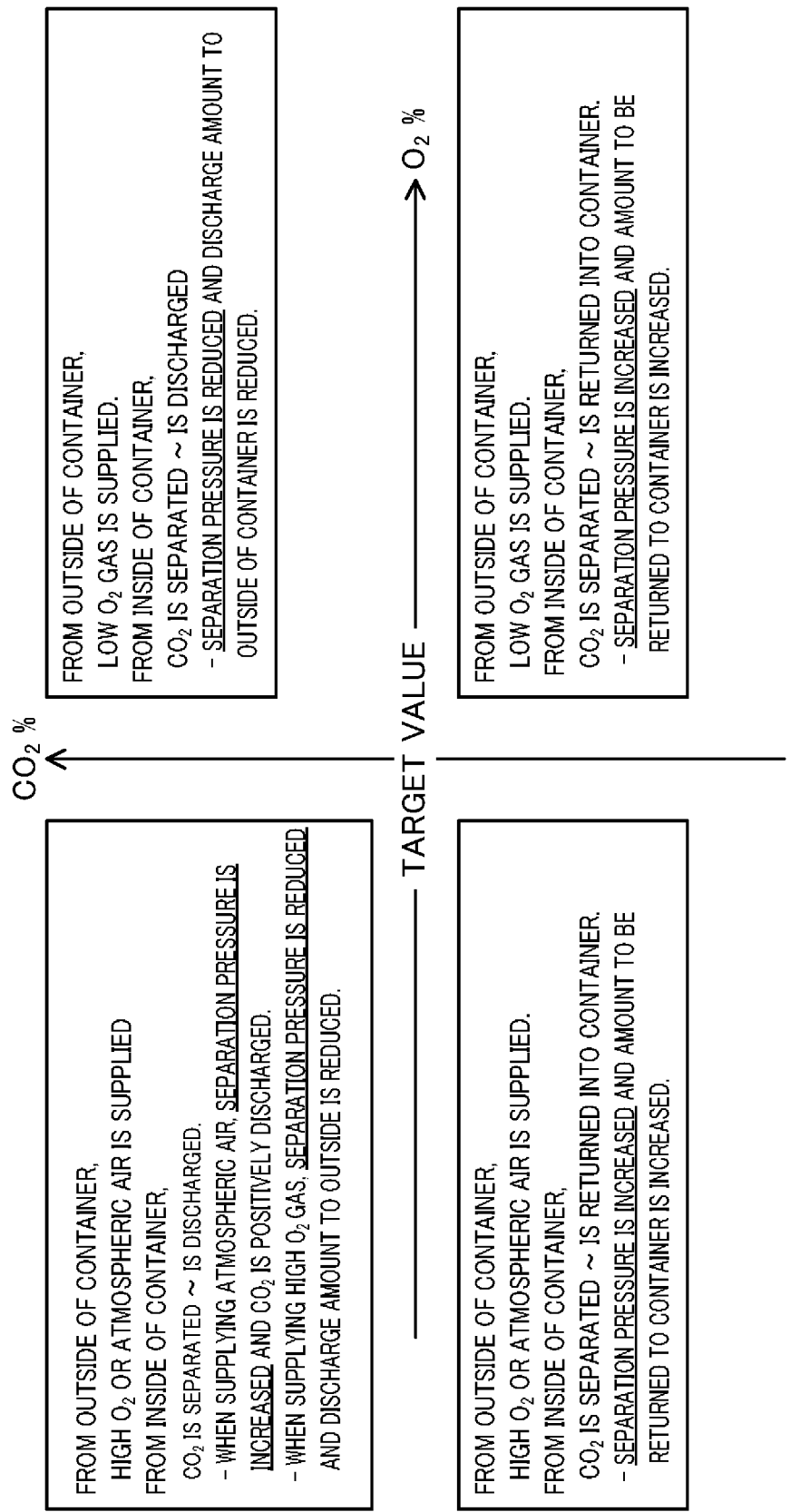
FIG. 9 shows details of pressure regulation operations.

Specific control of the pressure regulation is described based on FIG. 9.

First, as shown in the upper right area of FIG. 9, when the carbon dioxide concentration inside the transport container (1) is higher than the target value and the oxygen concentration is also higher than the target value, the controller (110) causes the first composition adjustment unit (40) to produce a low oxygen concentration gas having an oxygen concentration that is lower than the oxygen concentration of external air to supply the low oxygen concentration gas into the transport container (1), and causes the separation pressure of the gas separation films (85) of the second composition adjustment unit (60) to be reduced to reduce the discharge amount of the gas that is discharged to the outside of the transport container (1). This reduces both the carbon dioxide concentration and the oxygen concentration inside the transport container (1).

Next, as shown in the lower right area of FIG. 9, when the carbon dioxide concentration in the transport container (1) is lower than the target value and the oxygen concentration is higher than the target value, the controller (110) causes the first composition adjustment unit (40) to produce a low oxygen concentration gas having an oxygen concentration that is lower than the oxygen concentration of external air to supply the low oxygen concentration gas into the transport container (1), and makes use of the fact that the second composition adjustment unit (60) is configured to be capable of supplying air whose composition has been adjusted into the transport container (1) to increase the separation pressure of the gas separation films (85) of the second composition adjustment unit (60) to increase the amount of high carbon dioxide concentration gas whose composition has been adjusted and that is returned to the transport container (1). This increases the carbon dioxide concentration inside the transport container (1) and reduces the oxygen concentration.

As shown in the lower left area of FIG. 9, when the carbon dioxide concentration in the transport container (1) is lower than the target value and the oxygen concentration is lower than the target value, the controller (110) causes a high oxygen concentration gas having an oxygen concentration that is higher than the oxygen concentration of external air produced by the first composition adjustment unit (40) or external air to be supplied into the transport container (1), and makes use of the fact that the second composition adjustment unit (60) is configured to be capable of supplying air whose composition has been adjusted into the transport container (1) to increase the separation pressure of the gas separation films (85) of the second composition adjustment unit (60) to increase the amount of high carbon dioxide gas whose composition has been adjusted and that is returned to the transport container (1). This increases the carbon dioxide concentration inside the transport container (1) and increases the oxygen concentration.

As shown in the upper left area of FIG. 9, when the carbon dioxide concentration in the transport container (1) is higher than the target value and the oxygen concentration is lower than the target value, the controller (110) performs either a first operation or a second operation to be performed, the first operation being an operation in which external air is supplied into the internal space (1) and a carbon dioxide gas having a carbon dioxide concentration that is higher than that of internal air and produced by increasing the separation pressure of the gas separation films (85) of the second composition adjustment unit (60) is discharged into an external space (1), the second operation being an operation in which a high oxygen concentration gas having an oxygen concentration that is higher than that of external air and produced by the first composition adjustment unit (40) is supplied into the internal space (1), and the separation pressure of the separation films (85) of the second composition adjustment unit (60) is reduced to reduce the amount of air whose composition has been adjusted and that is discharged to the outside of the transport container (1). This reduces the carbon dioxide concentration inside the transport container (1) and increases the oxygen concentration.

As described above, in the embodiment, by regulating the separation pressure of the gas separation films (85), the controller (110) controls the carbon dioxide concentration and the oxygen concentration in the internal space so as to bring them close to their respective target values.

Effects of First Embodiment

According to the present embodiment, the pressure of air supplied into the gas separation films (85) from the air pumps (36, 37) is regulated by the first adjustment valve (46) and the second adjustment valve (66). Therefore, even if pumps having constant rotational speeds are used and the pump pressures are constant, it is possible to change the pressure of the gas that moves through the gas separation films (85). Consequently, it is possible to adjust the separation performance of the gas separation films (85) in accordance with necessary gas components.

According to the present embodiment, not only is the pressure regulator (46) provided on the downstream side with respect to the separation films (85) of the first composition adjustment unit (40), which is a path for air into the transport container (1) from the outside of the transport container (1), but also the pressure regulator (66) is provided on the downstream side with respect to the separation films (85) of the second composition adjustment unit (60), which is a path for air to the outside of the transport container (1) from the inside of the transport container (1). Therefore, it is possible to realize a structure that, by using two paths, regulates the separation pressure of the gas separation films (85) and adjusts their separation performance.

According to the present embodiment, when the carbon dioxide concentration in the storage box (1) is higher than the target value and the oxygen concentration is also higher than the target value, by regulating the separation pressure of the gas separation films (85) of the second composition adjustment unit (60) by the pressure regulators (39, 46, 66), it is possible to reduce the carbon dioxide concentration and the oxygen concentration of the internal air so as to bring both the carbon dioxide concentration and the oxygen concentration of the internal air close to their target values. When the carbon dioxide concentration in the storage box (1) is lower than the target value and the oxygen concentration is higher than the target value, by regulating the separation pressure of the gas separation films (85) of the second composition adjustment unit (60) by the pressure regulators (39, 46, 66), it is possible to increase the carbon dioxide concentration of the internal air and reduce the oxygen concentration so as to bring both the carbon dioxide concentration and the oxygen concentration of the internal air close to their target values.

According to the present embodiment, when the carbon dioxide concentration in the storage box (1) is lower than the target value and the oxygen concentration is also lower than the target value, by regulating the separation pressure of the gas separation films (85) of the second composition adjustment unit (60) by the pressure regulators (39, 46, 66), it is possible to increase the carbon dioxide concentration of the internal air and the oxygen concentration so as to bring both the carbon dioxide concentration and the oxygen concentration of the internal air close to their target values. When the carbon dioxide concentration in the storage box (1) is higher than the target value and the oxygen concentration in the storage box (1) is lower than the target value, by regulating the separation pressure of the gas separation films (85) of the second composition adjustment unit (60) by the pressure regulators (39, 46, 66), it is possible to reduce the carbon dioxide concentration of the internal air and increase the oxygen concentration so as to bring both the carbon dioxide concentration and the oxygen concentration of the internal air close to their target values.

In this way, according to the present embodiment, by regulating the separation pressure of the gas separation films (85), it is possible to control the carbon dioxide concentration and the oxygen concentration in the internal space so as to bring them close to their respective target values.

Second Embodiment

A second embodiment is described. An internal air adjustment device (30) of the present embodiment differs from the internal air adjustment device (30) of the first embodiment in the structure of a first composition adjustment unit (40) and the structure of a second composition adjustment unit (60). Here, the differences of the internal air adjustment device (30) of the present embodiment from the internal air adjustment device (30) of the first embodiment are described.

<First Composition Adjustment Unit>

Figure 7:
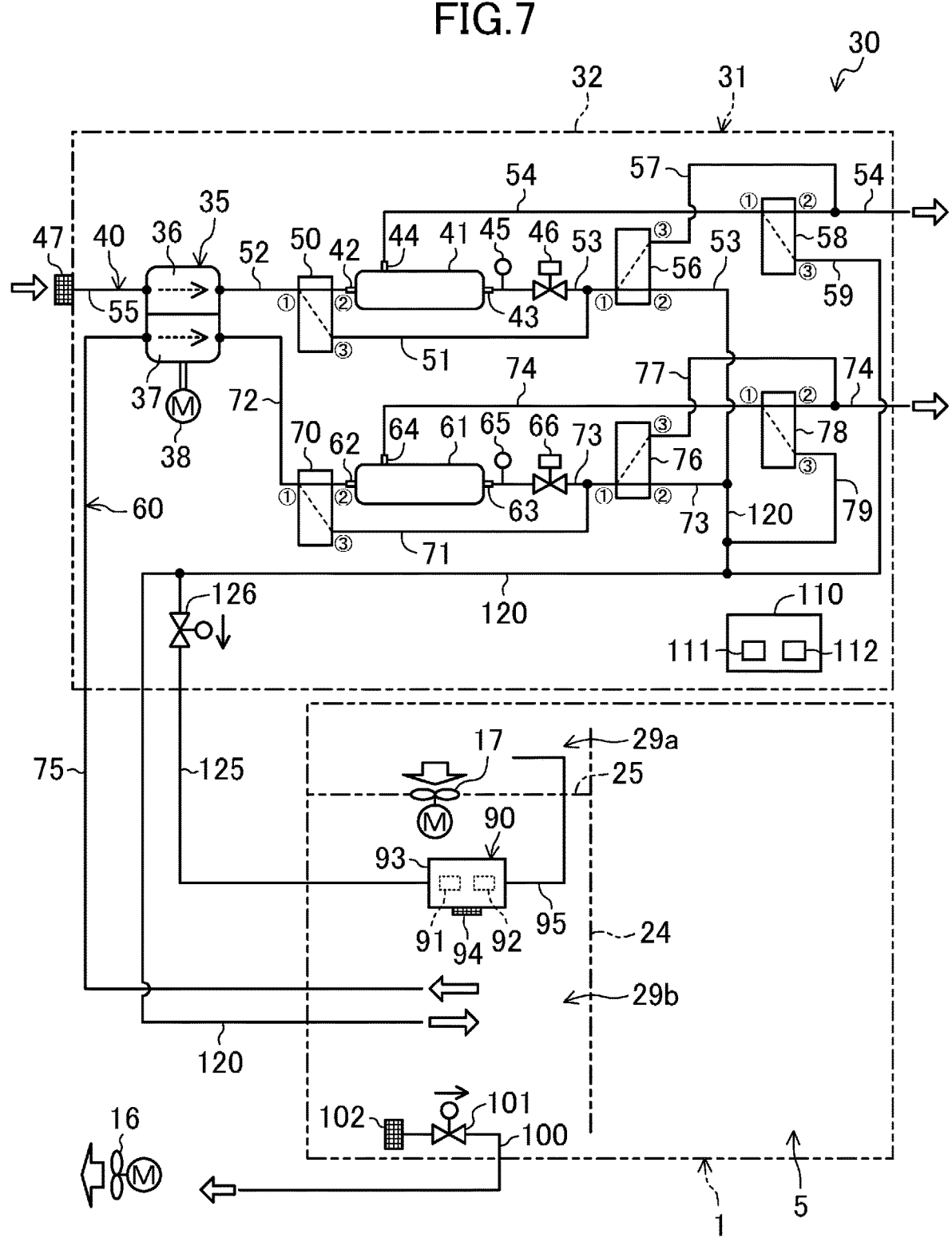
FIG. 7 is a pipe system diagram showing a structure of an internal air adjustment device of a second embodiment.

As shown in FIG. 7, a first primary-side switching valve (56), a first primary-side discharge pipe (57), a first secondary-side switching valve (58), and a first secondary-side supply pipe (59) are added to the first composition adjustment unit (40) of the present embodiment.

The first primary-side switching valve (56) and the first secondary-side switching valve (58) are each a switching valve having three ports. The first primary-side switching valve (56) and the first secondary-side switching valve (58) are each configured to be switched between a first state in which a first port communicates with a second port and is blocked from a third port (a state shown by a solid line in FIG. 7) and a second state in which the first port communicates with the third port and is blocked from the second port (a state shown by a broken line in FIG. 7).

The first primary-side switching valve (56) is disposed in the middle of a first primary-side pipe (53). In the first primary-side pipe (53), the first primary-side switching valve (56) is disposed closer than an outlet end of a first bypass pipe (51) to a supply pipe (120). The first port of the first primary-side switching valve (56) is connected to a first adjustment valve (46), and the second port of the first primary-side switching valve (56) is connected to the supply pipe (120). One end of the first primary-side discharge pipe (57) is connected to the third port of the first primary-side switching valve (56). The other end of the first primary-side discharge pipe (57) is connected to a first secondary-side pipe (54).

The first secondary-side switching valve (58) is disposed in the middle of the first secondary-side pipe (54). In the first secondary-side pipe (54), the first secondary-side switching valve (58) is disposed closer than the other end of the first primary-side discharge pipe (57) to a first separation module (41). The first port of the first secondary-side switching valve (58) is connected to a first secondary-side guide-out port (44) of the first separation module (41), and the second port of the first secondary-side switching valve (58) communicates with an external machine room (28) of the transport container (1) via a first secondary-side pipe (54). One end of the first secondary-side supply pipe (59) is connected to the third port of the first secondary-side switching valve (58). The other end of the first secondary-side supply pipe (59) is connected to the supply pipe (120).

<Second Composition Adjustment Unit>

A second primary-side switching valve (76), a second primary-side discharge pipe (77), a second secondary-side switching valve (78), and a second secondary-side supply pipe (79) are added to the second composition adjustment unit (60) of the present embodiment.

The second primary-side switching valve (76) and the second secondary-side switching valve (78) are each a switching valve having three ports. The second primary-side switching valve (76) and the second secondary-side switching valve (78) are each configured to be switched between a first state in which a first port communicates with a second port and is blocked from a third port (a state shown by a solid line in FIG. 7) and a second state in which the first port communicates with the third port and is blocked from the second port (a state shown by a broken line in FIG. 7).

The second primary-side switching valve (76) is disposed in the middle of a second primary-side pipe (73). In the second primary-side pipe (73), the second primary-side switching valve (76) is disposed closer than an outlet end of a second bypass pipe (71) to the supply pipe (120). The first port of the second primary-side switching valve (76) is connected to a second adjustment valve (66), and the second port of the second primary-side switching valve (76) is connected to the supply pipe (120). One end of the second primary-side discharge pipe (77) is connected to the third port of the second primary-side switching valve (76). The other end of the second primary-side discharge pipe (77) is connected to a second secondary-side pipe (74).

The second secondary-side switching valve (78) is disposed in the middle of the second secondary-side pipe (74). In the second secondary-side pipe (74), the second secondary-side switching valve (78) is disposed closer than the other end of the second primary-side discharge pipe (77) to a second separation module (61). The first port of the second secondary-side switching valve (78) is connected to a second secondary-side guide-out port (64) of the second separation module (61), and the second port of the second secondary-side switching valve (78) communicates with the external machine room (28) of the transport container (1) via the second secondary-side pipe (74). One end of the second secondary-side supply pipe (79) is connected to the third port of the second secondary-side switching valve (78). The other end of the second secondary-side supply pipe (79) is connected to the supply pipe (120).

Except for the points described above, the structure of the second embodiment is the same as the structure of the first embodiment.

—Operation—

In the first composition adjustment unit (40), when both the first primary-side switching valve (56) and the first secondary-side switching valve (58) are set in the first states (the states shown by the solid lines in FIG. 7), first external air moves through the first primary-side pipe (53) and is supplied into the transport container (1), and second external air moves through the second secondary-side pipe (74) and is discharged to the outside of the transport container (1). On the other hand, when both the first primary-side switching valve (56) and the first secondary-side switching valve (58) are set in the second states (the states shown by the broken lines in FIG. 7), the first external air moves through the first primary-side discharge pipe (57) and is discharged to the outside of the transport container (1), and the second external air moves through the first secondary-side supply pipe (59) and is supplied into the transport container (1).

In the second composition adjustment unit (60), when both the second primary-side switching valve (76) and the second secondary-side switching valve (78) are set in the first states (the states shown by the solid lines in FIG. 7), first internal air moves through the second primary-side pipe (73) and is supplied into the transport container (1), and second internal air moves through the second secondary-side pipe (74) and is discharged to the outside of the transport container (1). On the other hand, when both the second primary-side switching valve (76) and the second secondary-side switching valve (78) are set in the second states (the states shown by the broken lines in FIG. 7), the first internal air moves through the second primary-side discharge pipe (77) and is discharged to the outside of the transport container (1), and the second internal air moves through the second secondary-side supply pipe (79) and is supplied into the transport container (1).

The second embodiment also provides operational effects similar to the operational effects provided by the first embodiment.

Modifications of Second Embodiment

First Modification

Figure 8:
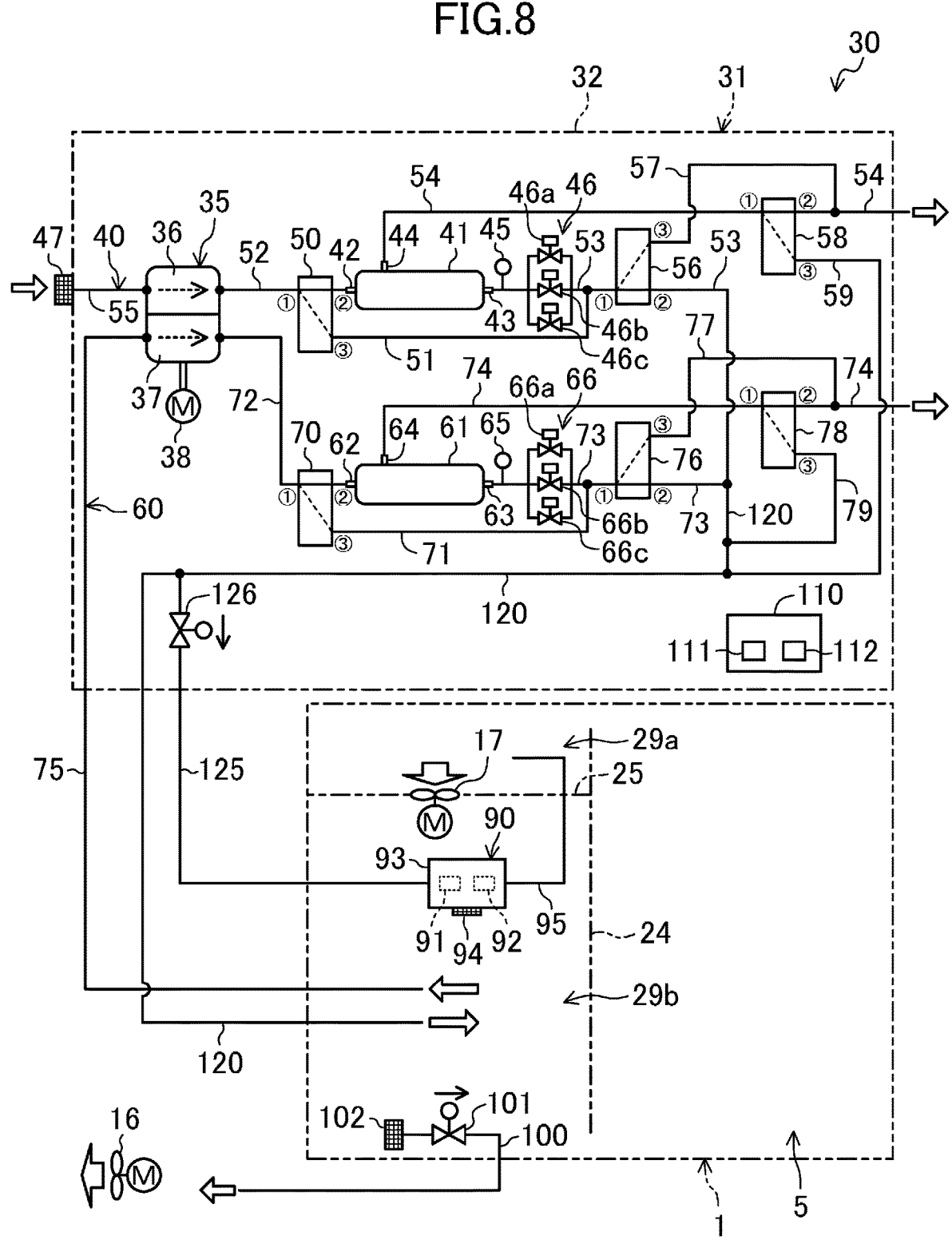
FIG. 8 is a pipe system diagram showing a structure of an internal air adjustment device according to a first modification of the second embodiment.

Although, in the first embodiment shown in FIG. 3 and in the second embodiment shown in FIG. 7, electric valves whose opening degrees are changeable are used as the first adjustment valve (46) and the second adjustment valve (66) whose opening degrees are adjustable, and the electric valves are used as pressure regulators (valve mechanisms), as shown in FIG. 8, the first adjustment valve (46) and the second adjustment valve (66) may be valves including a plurality of electromagnetic valves (on-off valves) (46a, 46b, 46c, 66a, 66b, 66c) that have different apertures and that are connected to each other in parallel. Even in this case, by performing a controlling operation to determine which electromagnetic valves are to be opened and which electromagnetic valves are to be closed in accordance with the detected values of the pressure sensors (45, 65), it is possible to regulate the pressure of air that moves through the gas separation films (85). Therefore, even if the structure of the modification is used, it is possible to easily realize a structure that adjusts the separation performance of the gas separation films (85) in accordance with necessary gas components.

As in the first embodiment, the first adjustment valve (46) is disposed on the downstream side with respect to the separation films (85) of the first composition adjustment unit (40), and the second adjustment valve (66) is disposed on the downstream side with respect to the separation films (85) of the second composition adjustment unit (60).

Second Modification

Figure 10:
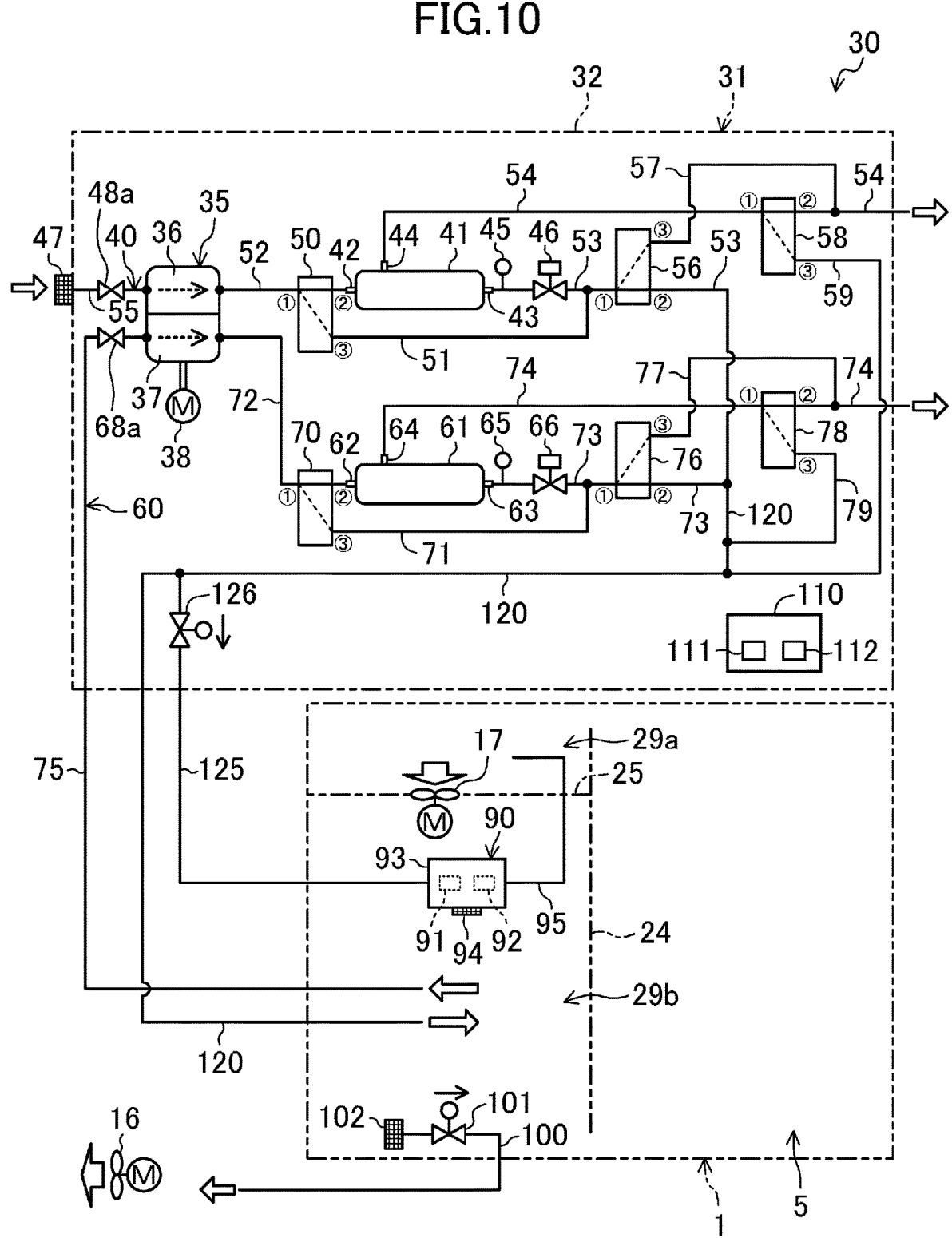
FIG. 10 is a pipe system diagram showing a structure of an internal air adjustment device according to a second modification of the second embodiment.

As shown in FIG. 10, a third adjustment valve (48a (48)) and a fourth adjustment valve (68a (68)) that are provided on an inflow side where air flows into the air pumps (36, 37) and that have adjustable opening degrees may be used as the pressure regulators (48, 68).

Even in this case, by controlling the opening degree of the third adjustment valve (48a) and the opening degree of the fourth adjustment valve (68a) by adjusting them in accordance with the detected values of the pressure sensors (45, 65), it is possible to change the discharge pressures of the air pumps (36, 37) and thus regulate the pressure of air that moves through the gas separation films (85). Therefore, even if the structure of the second modification is used, it is possible to easily realize a structure that adjusts the separation performance of the gas separation films (85) in accordance with necessary gas components.

In the modification, the first adjustment valve (46) and the second adjustment valve (66) may be electromagnetic valves (on-off valves).

Third Modification

Figure 11:
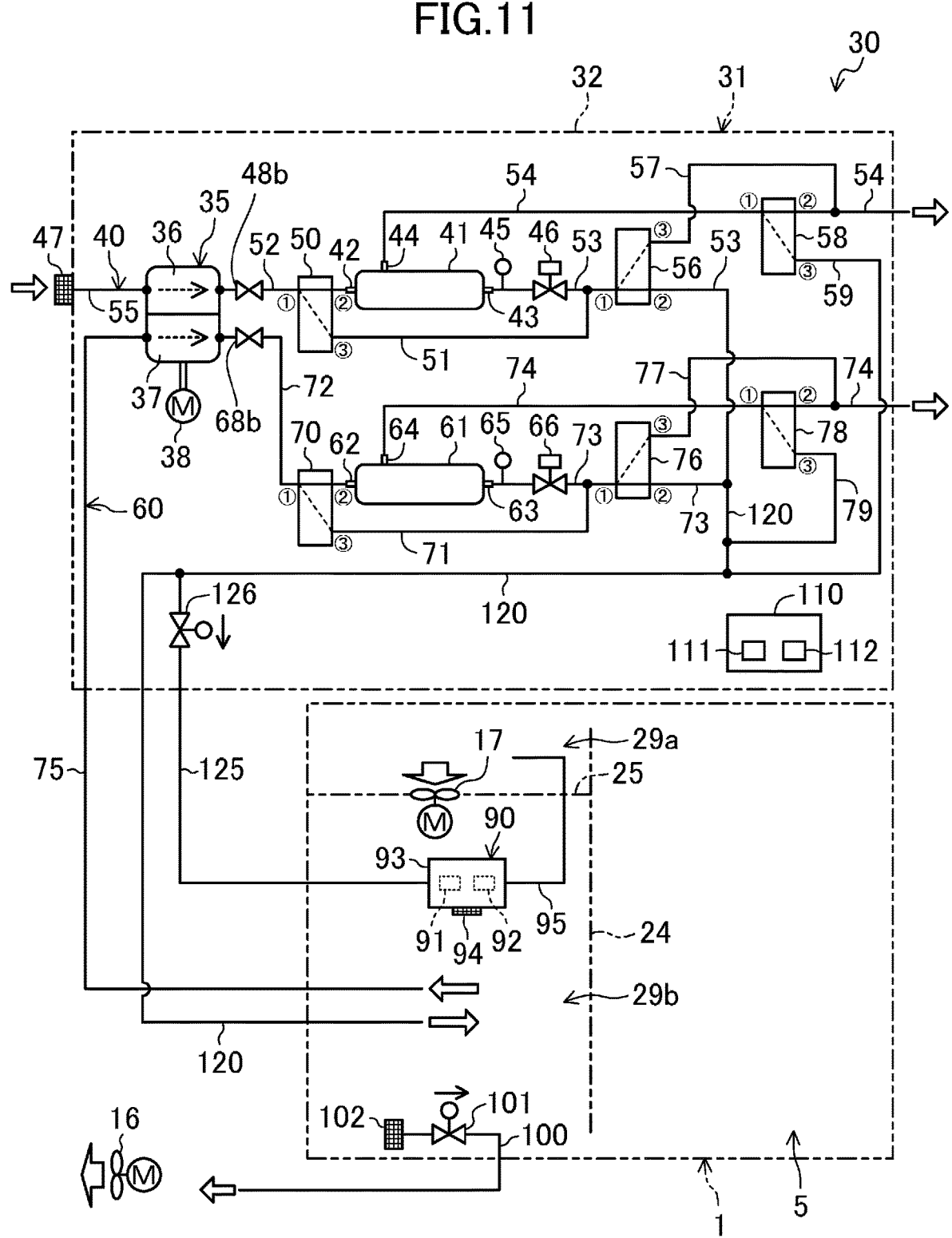
FIG. 11 is a pipe system diagram showing a structure of an internal air adjustment device according to a third modification of the second embodiment.

As shown in FIG. 11, a third adjustment valve (48b (48)) and a fourth adjustment valve (68b (68)) that are provided on an outflow side where air flows out from the air pumps (36, 37) and that have adjustable opening degrees may be used as the pressure regulators (48, 68).

Even in this case, by controlling the opening degree of the third adjustment valve (48b) and the opening degree of the fourth adjustment valve (68b) by adjusting them in accordance with the detected values of the pressure sensors (45, 65), it is possible to change the discharge pressures of the air pumps (36, 37) and thus regulate the pressure of air that moves through the gas separation films (85). Therefore, even if the structure of the third modification is used, it is possible to easily realize a structure that adjusts the separation performance of the gas separation films (85) in accordance with necessary gas components.

Fourth Modification

Figure 12:
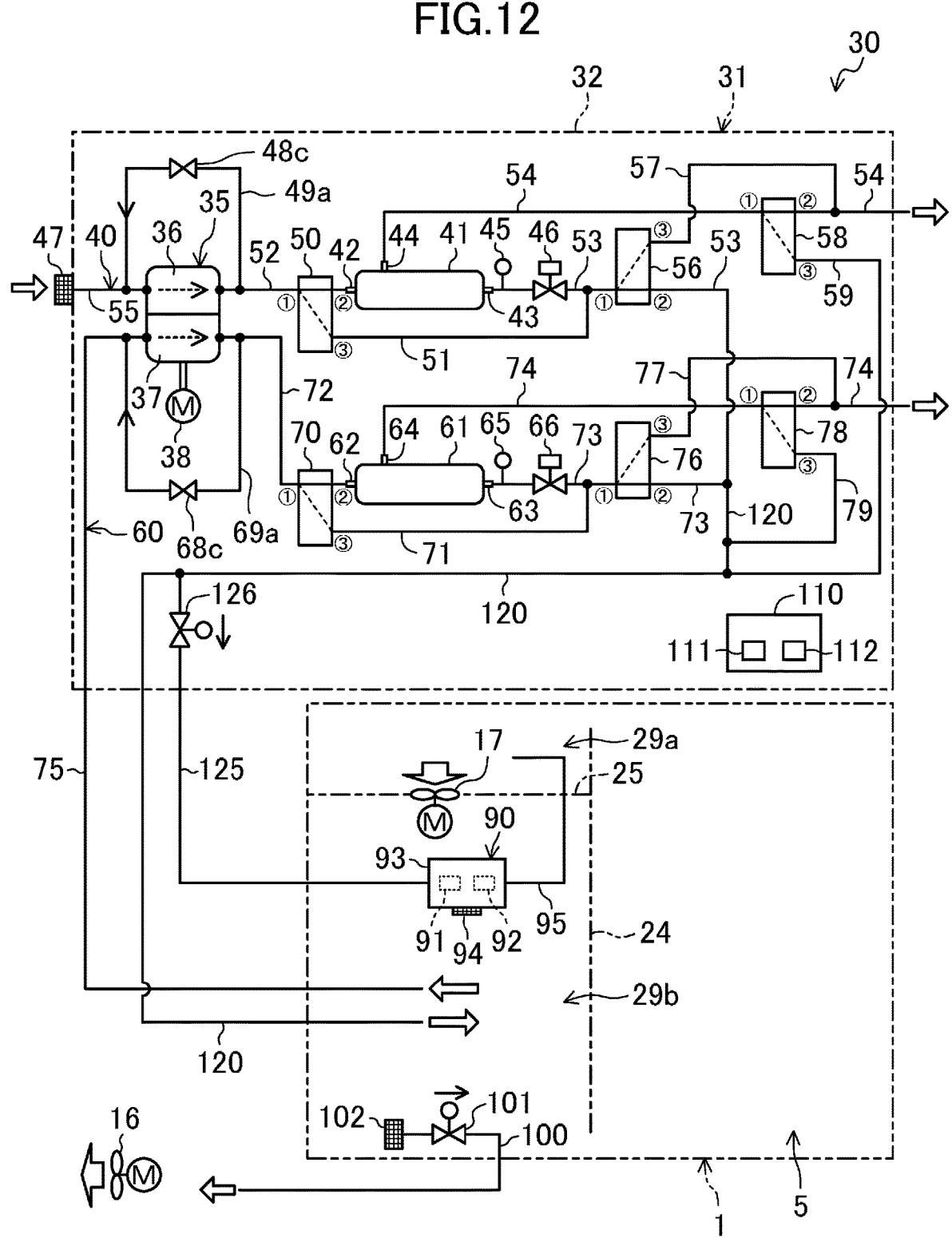
FIG. 12 is a pipe system diagram showing a structure of an internal air adjustment device according to a fourth modification of the second embodiment.

As shown in FIG. 12, a third adjustment valve (48c (48)) and a fourth adjustment valve (68c (68)) that are provided on an outflow side where air flows out from the respective air pumps (36, 37) and that have adjustable opening degrees may be used as the pressure regulators (48, 68), and return paths (49a, 69a (49, 69)) that return air that moves through the respective pressure regulators (48, 68) to an inflow side where air flows into the respective air pumps (36, 37) may be provided. In other words, the return paths (49a, 69a (49, 69)) serving as bypasses that bypass the respective air pumps (36, 37) may be provided, and the third adjustment valve (48c (48)) and the fourth adjustment valve (68c (68)) that have adjustable opening degrees may be provided in the respective return paths (49a, 69a (49, 69)).

Even in this case, by controlling the opening degree of the third adjustment valve (48c) and the opening degree of the fourth adjustment valve (68c) by adjusting them in accordance with the detected values of the pressure sensors (45, 65), it is possible to change the discharge pressures of the air pumps (36, 37) and thus regulate the pressure of air that moves through the gas separation films (85). Therefore, even if the structure of the fourth modification is used, it is possible to easily realize a structure that adjusts the separation performance of the gas separation films (85) in accordance with necessary gas components.

Fifth Modification

Figure 13:
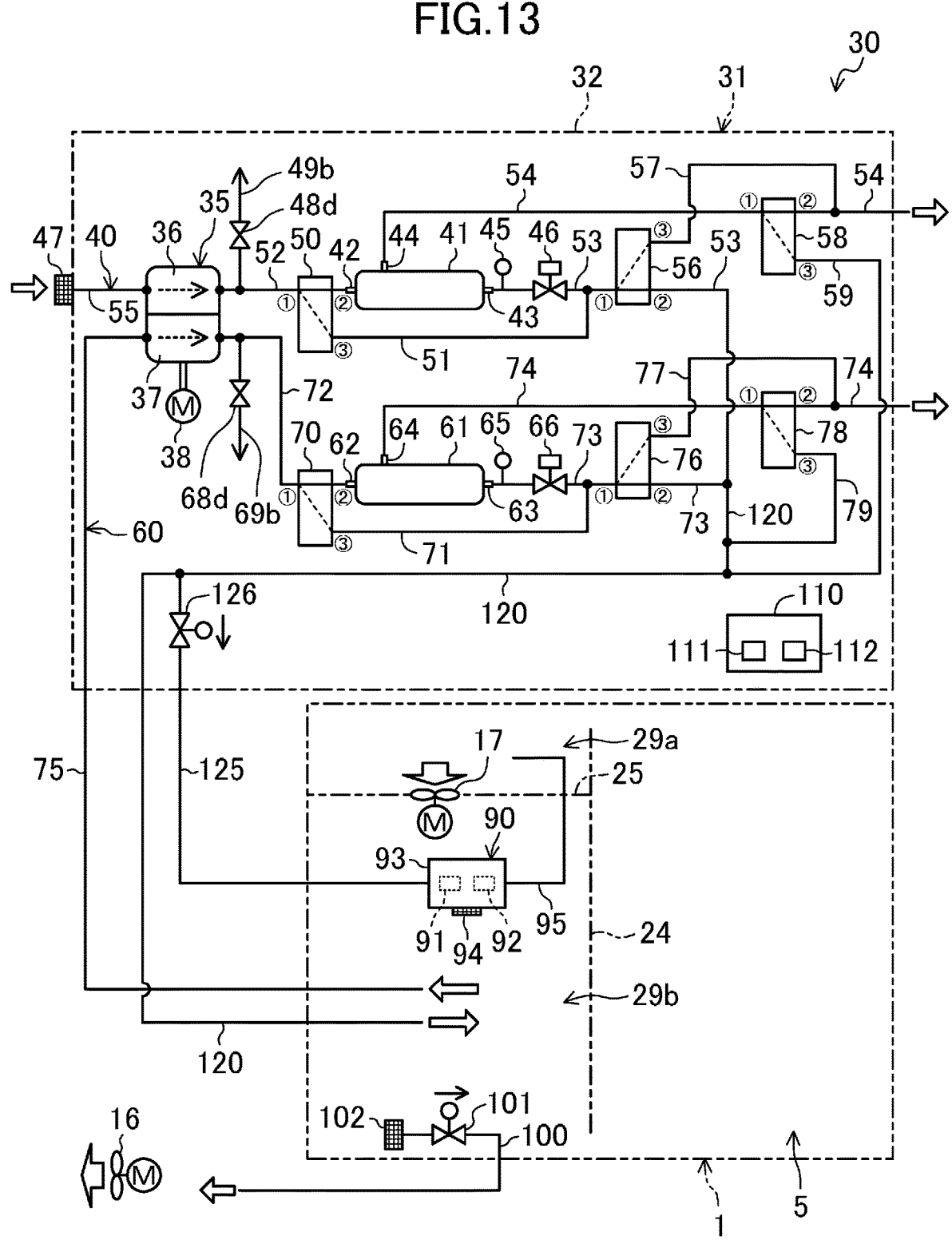
FIG. 13 is a pipe system diagram showing a structure of an internal air adjustment device according to a fifth modification of the second embodiment.

As shown in FIG. 13, a third adjustment valve (48d (48)) and a fourth adjustment valve (68d (68)) that are provided on an outflow side where air flows out from the respective air pumps (36, 37) and that have adjustable opening degrees may be used as the pressure regulators (48, 68), and exhaust passages (49b, 69b (49, 69)) that exhaust air that moves through the pressure regulators (48, 68) may be provided.

Even in this case, by controlling the opening degree of the third adjustment valve (48d) and the opening degree of the fourth adjustment valve (68d) by adjusting them in accordance with the detected values of the pressure sensors (45, 65), it is possible to change the pressure of air on a discharge side of the air pumps (36, 37) and thus regulate the pressure of air that moves through the gas separation films (85). Therefore, even if the structure of the fifth modification is used, it is possible to easily realize a structure that adjusts the separation performance of the gas separation films (85) in accordance with necessary gas components.

Third Embodiment

An internal air adjustment device (30) of a third embodiment is described. The internal air adjustment device (30) of the third embodiment is a device in which a first composition adjustment unit (40) and a controller (110) differ from those of the internal air adjustment device (30) of the second embodiment, and the structure of a second composition adjustment unit (60) is the same as that of the second embodiment. The internal air adjustment device (30) includes, in addition to a first directional control valve (232) and a second directional control valve (233) of the first composition adjustment unit (40) described below, a third directional control valve (291) and a fourth directional control valve (292). Here, the differences of the internal air adjustment device (30) of the third embodiment from the internal air adjustment devices (30) of the first and second embodiments are described.

—Structure of First Composition Adjustment Unit—

Similarly to the first composition adjustment unit (40) of the first embodiment, the first composition adjustment unit (40) of the present embodiment is configured to separate external air sucked in from the outside of a transport container (1) (untreated external air) into first external air and second external air. The first composition adjustment unit (40) of the present embodiment is configured to separate the untreated external air into the first external air and the second external air by a PSA (Pressure Swing Adsorption) method, and differs from the first composition adjustment unit (40) of the first embodiment on this point.

As shown in FIG. 12, the first composition adjustment unit (40) of the present embodiment includes an air pump (231) instead of the first pump (36) of the pump unit (35). That is, although, in the internal air adjustment device (30) of the present embodiment, a pump unit (35) includes a second pump (37) and a driving motor (38), the pump unit (35) does not include a first pump (36). The first composition adjustment unit (40) of the present embodiment also includes the first directional control valve (232) and the second directional control valve (233), and a first adsorption cylinder (234) and a second adsorption cylinder (235). As described below, an adsorbent that adsorbs nitrogen in air is provided in each adsorption cylinder (234, 235).

<Air Pump>

The air pump (231) is disposed in an internal space of a unit case (32). The air pump (231) includes a first pump mechanism (231a) and a second pump mechanism (231b) that suck in, press, and discharge air. The first pump mechanism (231a) and the second pump mechanism (231b) are each an oilless pump that does not use a lubricant. The first pump mechanism (231a), which is a compressing portion, and the second pump mechanism (231b), which is a decompressing portion, are both connected to a driving shaft of a driving motor (231c). The first pump mechanism (231a) and the second pump mechanism (231b) are each rotationally driven by the driving motor (231c) to suck in air from an intake port and compress it, and discharge the compressed air out from a discharge port.

<Outside Air Pipe, Discharge Pipe, Filter Unit>

One end of an outside air pipe (241) that defines an outside air passage is connected to the intake port of the first pump mechanism (231a). The outside air pipe (241) is provided so as to extend through the unit case (32). The other end of the outside air pipe (241) that is positioned outside the unit case (32) is connected to a filter unit (220).

The filter unit (220) includes an air filter (47). The air filter (47) is a filter for trapping, for example, dust or salt contained in external air. In the present embodiment, a water-proof membrane filter having ventilation characteristics is used as the air filter (47). The filter unit (220) is a box-shaped member and introduces air that has moved through the air filter (47) (external air) to the outside air pipe (241). Although not shown, the filter unit (220) is disposed on a downstream side with respect to a condenser (13) in an external machine room (28).

One end of a discharge pipe (242) that defines a discharge passage is connected to the discharge port of the first pump mechanism (231a). The discharge pipe (242) is divided into two branch pipes at the other end, with one of the branch pipes connected to the first directional control valve (232) and the other of the branch pipes connected to the second directional control valve (233).

<Suck-in Pipe, Supply Pipe>

One end of a suck-in pipe (243) that defines a suck-in passage is connected to the intake port of the second pump mechanism (231b). The suck-in pipe (243) is divided into two branch pipes at the other end, with one of the branch pipes connected to the first directional control valve (232) and the other of the branch pipes connected to the second directional control valve (233).

One end of a supply connection pipe (244) that defines a supply passage is connected to the discharge port of the second pump mechanism (231b). The other end of the supply connection pipe (244) is connected to a supply pipe (120).

A check valve (264) and a supply-side on-off valve (273) are provided at the supply connection pipe (244) in this order from one end to the other end thereof. The check valve (264) only allows flow of air from the one end of the supply connection pipe (244) toward the other end and prevents flow of air in the reverse direction. The supply-side on-off valve (273) is an on-off valve constituted by an electromagnetic valve.

<First and Second Directional Control Valves>

The first directional control valve (232) and the second directional control valve (233) are each a switching valve having three ports. Each directional control valve (232, 233) is configured to be switched between a first state in which a first port communicates with a second port and is blocked from a third port and a second state in which the first port communicates with the third port and is blocked from the second port.

The first port of the first directional control valve (232) is connected to one end of the first adsorption cylinder (234). The one branch pipe of the discharge pipe (242) is connected to the second port of the first directional control valve (232), and the other branch pipe of the suck-in pipe (243) is connected to the third port of the first directional control valve (232). The first directional control valve (232) switches the first adsorption cylinder (234) between a state in which the first adsorption cylinder (234) communicates with the first pump mechanism (231a) and a state in which the first adsorption cylinder (234) communicates with the second pump mechanism (231b).

The first port of the second directional control valve (233) is connected to one end of the second adsorption cylinder (235). The other branch pipe of the discharge pipe (242) is connected to the second port of the second directional control valve (233), and the one branch pipe of the suck-in pipe (243) is connected to the third port of the second directional control valve (233). The second directional control valve (233) switches the second adsorption cylinder (235) between a state in which the second adsorption cylinder (235) communicates with the first pump mechanism (231a) and a state in which the second adsorption cylinder (235) communicates with the second pump mechanism (231b).

<Adsorption Cylinders>

The first adsorption cylinder (234) and the second adsorption cylinder (235) are each a member including a cylindrical container having both ends closed and an adsorbent with which the container is filled.

The adsorbent with which each adsorption cylinder (234, 235) is filled has the property of adsorbing a nitrogen component in a compressed state where the pressure is higher than the atmospheric pressure and desorbing a nitrogen component in a decompressed state where the pressure is lower than the atmospheric pressure. In the present embodiment, as the adsorbent, for example, porous zeolite having pores having a pore diameter that is smaller than the molecular diameter of nitrogen molecules (3.0 angstroms) and a pore diameter that is larger than the molecular diameter of oxygen molecules (2.8 angstroms) is used.

In the first composition adjustment unit (40) of the present embodiment, the first adsorption cylinder (234) and the second adsorption cylinder (235) constitute a first separation unit (41). The two adsorption cylinders (234, 235) that constitute the first separation unit (41) separate untreated external air into first external air having a nitrogen concentration that is higher than that of the untreated external air and an oxygen concentration that is lower than that of the untreated external air and second external air having a nitrogen concentration that is lower than that of the untreated external air and an oxygen concentration that is higher than that of the untreated external air.

<Oxygen Discharge Pipe>

An oxygen discharge pipe (245) that defines an oxygen discharge passage is divided into two branch pipes at one end, with one of the branch pipes connected to the other end of the first adsorption cylinder (234) and the other of the branch pipes connected to the second adsorption cylinder (235). Each branch pipe of the oxygen discharge pipe (245) is provided with one check valve (261). Each check valve (261) allows the flow of air flowing out from a corresponding one of the adsorption cylinders (234, 235) and prevents the flow of air in the reverse direction.

A check valve (262) and an orifice (263) are provided at a collecting portion of the oxygen discharge pipe (245). The check valve (262) is disposed closer than the orifice (263) to the other end of the oxygen discharge pipe (245). The check valve (262) allows the flow of air toward the other end of the oxygen discharge pipe (245) and prevents the flow of air in the reverse direction.

<Purge Pipe>

A purge pipe (250) that defines a purge passage is connected to each branch pipe of the oxygen discharge pipe (245). One end of the purge pipe (250) is connected to the branch pipe that is connected to the first adsorption cylinder (234) and the other end of the purge pipe (250) is connected to the branch pipe that is connected to the second adsorption cylinder (235). The one end of the purge pipe (250) is connected at a location between the first adsorption cylinder (234) and the check valve (261). The other end of the purge pipe (250) is connected at a location between the second adsorption cylinder (235) and the check valve (261).

A purge valve (251) is provided at the purge pipe (250). The purge valve (251) is an on-off valve constituted by an electromagnetic valve. The purge valve (251) is opened when making the pressure of the first adsorption cylinder (234) and the pressure of the second adsorption cylinder (235) equal to each other. One orifice (252) is provided on each of two sides of the purge valve (251) at the purge pipe (250).

<Exhaust Connection Pipe>

An exhaust connection pipe (271) that defines an exhaust connection passage is connected to the supply connection pipe (244). One end of the exhaust connection pipe (271) is connected to the supply connection pipe (244) and the other end of the exhaust connection pipe (271) is connected to the oxygen discharge pipe (245). The one end of the exhaust connection pipe (271) is connected at a location between the check valve (264) and the second pump mechanism (231b) at the supply connection pipe (244). The other end of the exhaust connection pipe (271) is connected closer than the check valve (262) at the oxygen discharge pipe (245) to an external side.

An exhaust on-off valve (272) is provided at the exhaust connection pipe (271). The exhaust on-off valve (272) is an on-off valve constituted by an electromagnetic valve. The exhaust on-off valve (272) is opened when air that flows through the supply connection pipe (244) is discharged to the outside of the transport container.

<Measurement Connection Pipe>

A measurement connection pipe (281) that defines a measurement passage is connected to the supply connection pipe (244). The measurement connection pipe (281) is a pipe for connecting the first composition adjustment unit (40) to a sensor unit (90).

One end of the measurement connection pipe (281) is connected to the supply connection pipe (244), and the other end of the measurement connection pipe (281) is connected to a measurement pipe (125). The one end of the measurement connection pipe (281) is connected at a location between the supply-side on-off valve (273) and the check valve (264) at the supply connection pipe (244). The other end of the measurement connection pipe (281) is connected at a location between the sensor unit (90) and the measurement on-off valve (126) at the measurement pipe (125).

A measurement on-off valve (282) is provided at the measurement connection pipe (281). The measurement on-off valve (282) is an on-off valve constituted by an electromagnetic valve. The measurement on-off valve (282) is opened when sending air flowing through the supply connection pipe (244) to the sensor unit (90).

<Bypass Pipe>

A bypass connection pipe (255) that defines a bypass passage is connected to the discharge pipe (242). One end of the bypass connection pipe (255) is connected to the discharge pipe (242), and the other end of the bypass connection pipe (255) is connected to the measurement connection pipe (281). The one end of the bypass connection pipe (255) is connected at a location closer than a branched location of the discharge pipe (242) to the first pump mechanism (231a). The other end of the bypass connection pipe (255) is connected at a location between one end of the measurement connection pipe (281) and the measurement on-off valve (282). The bypass connection pipe (255) defines a first bypass passage for supplying external air into the internal space of the transport container (1) by causing the external air to bypass the first adsorption cylinder (234) and the second adsorption cylinder (235).

A bypass on-off valve (256) is provided at the bypass connection pipe (255). The bypass on-off valve (256) is an on-off valve constituted by an electromagnetic valve. The bypass on-off valve (256) constitutes a first bypass valve mechanism for changing the flow rate of the external air that flows into the bypass connection pipe (255). The bypass on-off valve (256) is opened when supplying the external air discharged by the first pump mechanism (231a) into the load room (5) without changing the composition of the external air.

<Third and Fourth Directional Control Valves>

The third directional control valve (291) and the fourth directional control valve (292) are each a switching valve having three ports. Each directional control valve (291, 292) is configured to be switched between a first state in which a first port communicates with a second port and is blocked from a third port and a second state in which the first port communicates with the third port and is blocked from the second port.

One end of a first exhaust pipe (301) is connected to the other end of the oxygen discharge pipe (245) and the other end of the exhaust connection pipe (271) that are merged. The third directional control valve (291) is connected at a location in the first exhaust pipe (301). Specifically, the first exhaust pipe (301) is connected to the first port and the second port of the third directional control valve (291). The first exhaust pipe (301) is provided so as to extend through the unit case (32). The other end of the first exhaust pipe (301) opens into the external space of the transport container (1).

The fourth directional control valve (292) is provided between the supply pipe (120) and the supply-side on-off valve (273) at the supply connection pipe (244). Specifically, the supply connection pipe (244) is connected to the first port and the second port of the fourth directional control valve (292). One end of a supply branch connection pipe (302) is connected to the supply connection pipe (244) at a location between the second port of the fourth directional control valve (292) and the supply pipe (120). The other end of the supply branch connection pipe (302) is connected to the third port of the third directional control valve (291). One end of a second exhaust pipe (303) is connected to the third port of the fourth directional control valve (292). The other end of the second exhaust pipe (303) is connected to the first exhaust pipe (301) inside the unit case (32) of a main body unit (31).

—Operation of First Composition Adjustment Unit—

An operation of the first composition adjustment unit (40) of the present embodiment is described.

The first composition adjustment unit (40) of the present embodiment separates untreated external air into first external air and second external air by alternately repeating a first operation and a second operation, which are described below, every predetermined time (for example, 14.5 seconds). Similarly to the first composition adjustment units (40) of the first and second embodiments, the first composition adjustment unit (40) of the present embodiment separates untreated external air into first external air and second external air in each of an oxygen concentration reduction operation and a carbon dioxide concentration reduction operation of the internal air adjustment device (30).

<First Operation>

As shown in FIG. 13, in the first operation, the first directional control valve (232) is set in the first state, and the second directional control valve (233) is set in the second state. As a result, the discharge port of the first pump mechanism (231a) is connected to the first adsorption cylinder (234), and the second adsorption cylinder (235) is connected to the intake port of the second pump mechanism (231b). In the first operation, the supply-side on-off valve (273) is opened, and the remaining on-off valves (251, 256, 272, 282) are closed. In the first operation, an adsorption operation of the first adsorption cylinder (234) and a desorption operation of the second adsorption cylinder (235) are performed.

The first pump mechanism (231a) sucks in untreated external air from the outside air pipe (241) and compresses the untreated external air to supply the compressed untreated external air into the first adsorption cylinder (234). In the first adsorption cylinder (234), nitrogen that is contained in the supplied untreated external air is adsorbed onto an adsorbent. As a result, in the first adsorption cylinder (234), second external air having a nitrogen concentration that is lower than that of the untreated external air and an oxygen concentration that is higher than that of the untreated external air is produced. The second external air flows out from the first adsorption cylinder (234), flows through the oxygen discharge pipe (245), passes through the third directional control valve (291), and is discharged to external space as discharge air.

On the other hand, the second pump mechanism (231b) sucks in air from the second adsorption cylinder (235). In the second adsorption cylinder (235), internal pressure therein is reduced and nitrogen is desorbed from an adsorbent. As a result, in the second adsorption cylinder (235), first external air having a nitrogen concentration that is higher than that of the untreated external air and an oxygen concentration that is lower than that of the untreated external air is produced. The first external air flows into the suck-in pipe (243) from the first adsorption cylinder (234) and is sucked into the second pump mechanism (231b). The second pump mechanism (231b) compresses the sucked-in first external air and discharges it into the supply connection pipe (244). The first external air flows through the supply connection pipe (244)

as supply air, and, after merging with air that flows through the supply pipe (120), is supplied into internal space.

<Second Operation>

Figure 14:
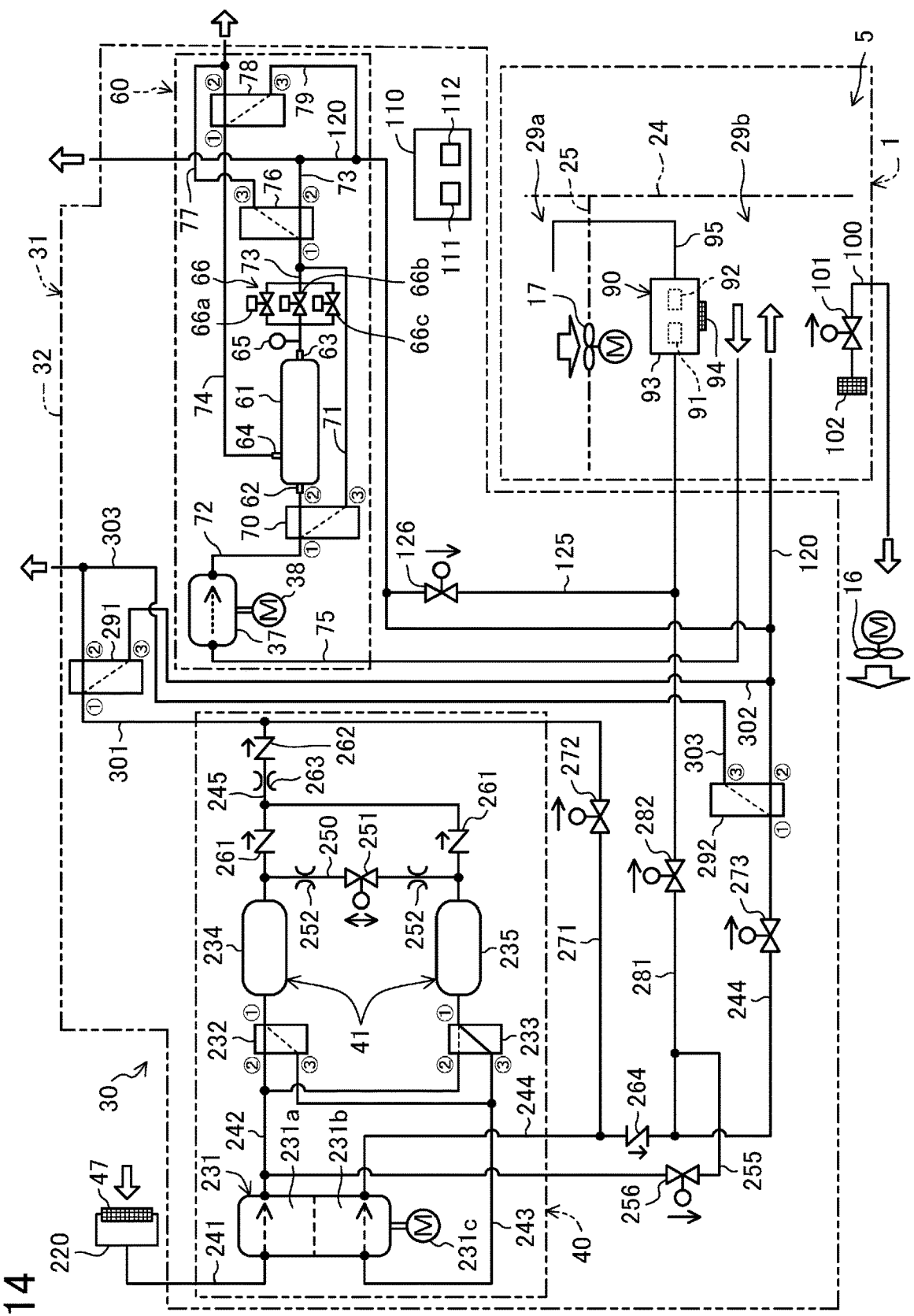
FIG. 14 is a pipe system diagram showing a structure of an internal air adjustment device of a third embodiment.
Figure 15:
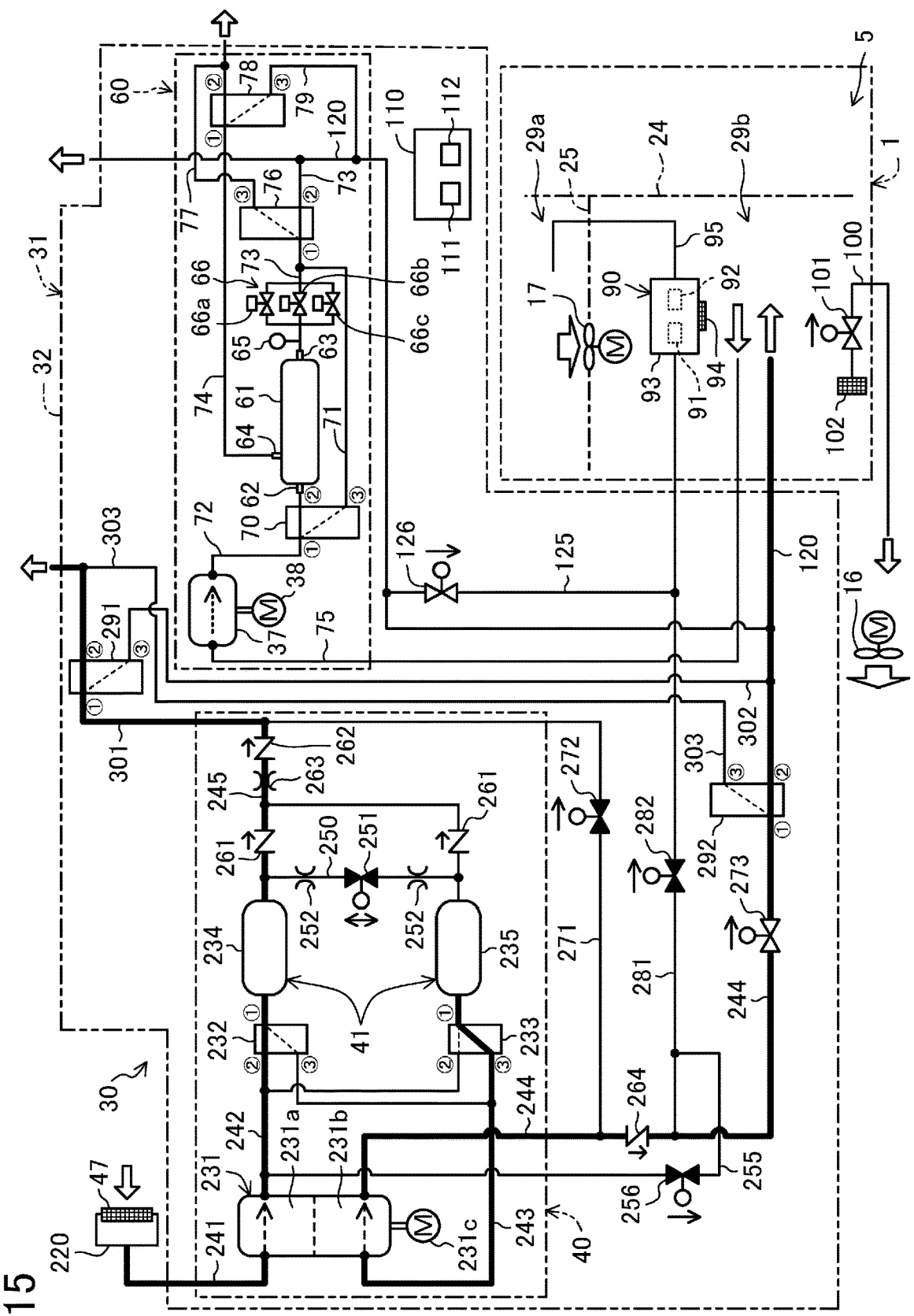
FIG. 15 is a pipe system diagram of the internal air adjustment device showing a first composition adjustment unit of the third embodiment in a first operating state.
Figure 16:
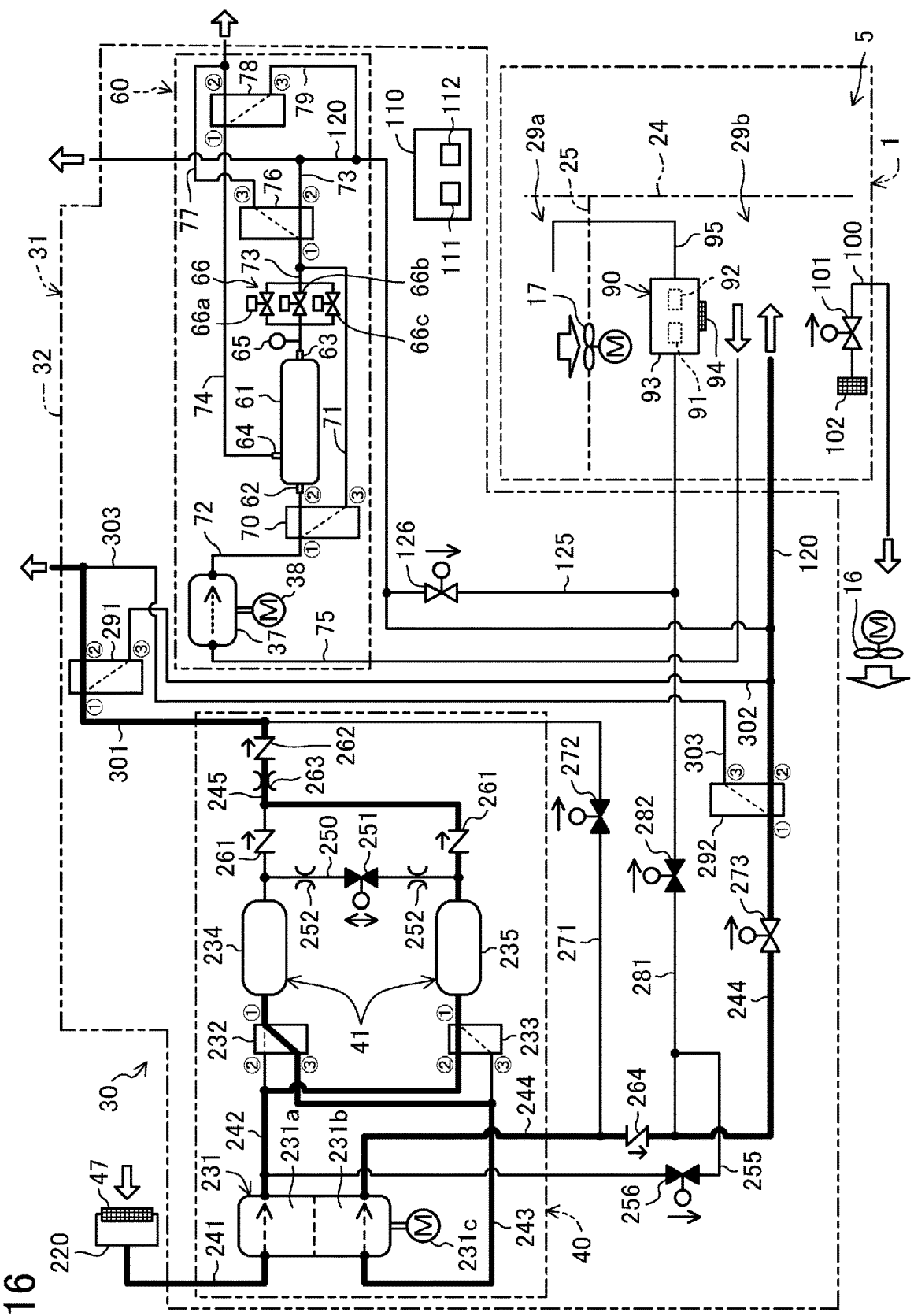
FIG. 16 is a pipe system diagram of the internal air adjustment device showing the first composition adjustment unit of the third embodiment in a second operating state.

As shown in FIG. 14, in the second operation, the first directional control valve (232) is set in the second state, and the second directional control valve (233) is set in the first state. As a result, the discharge port of the first pump mechanism (231a) is connected to the second adsorption cylinder (235), and the first adsorption cylinder (234) is connected to the intake port of the second pump mechanism (231b). In the second operation, the supply-side on-off valve (273) is opened, and the remaining on-off valves (251, 256, 272, 282) are closed. In the second operation, a desorption operation of the first adsorption cylinder (234) and an adsorption operation of the second adsorption cylinder (235) are performed.

The first pump mechanism (231a) sucks in untreated external air from the outside air pipe (241) and compresses the untreated external air to supply the compressed untreated external air into the second adsorption cylinder (235). In the second adsorption cylinder (235), nitrogen that is contained in the supplied untreated external air is adsorbed onto an adsorbent. As a result, in the second adsorption cylinder (235), second external air having a nitrogen concentration that is lower than that of the untreated external air and an oxygen concentration that is higher than that of the untreated external air is produced. The second external air flows out from the second adsorption cylinder (235), flows through the oxygen discharge pipe (245), passes through the third directional control valve (291), and is discharged to external space as discharge air.

On the other hand, the second pump mechanism (231b) sucks in air from the first adsorption cylinder (234). In the first adsorption cylinder (234), internal pressure therein is reduced and nitrogen is desorbed from an adsorbent. As a result, in the first adsorption cylinder (234), first external air having a nitrogen concentration that is higher than that of the untreated external air and an oxygen concentration that is lower than that of the untreated external air is produced. The first external air flows into the suck-in pipe (243) from the first adsorption cylinder (234) and is sucked into the second pump mechanism (231b). The second pump mechanism (231b) compresses the sucked-in first external air and discharges it into the supply connection pipe (244). The first external air flows through the supply connection pipe (244) as supply air, and, after merging with air that flows through the supply pipe (120), is supplied into internal space.

According to the third embodiment, in the structure including the adsorption units (234, 235) that are provided with an adsorbent, in addition to the first composition adjustment unit (40) that separates nitrogen and oxygen from the internal air of a storage box (1) by gas separation films (85) to produce low oxygen concentration gas and high oxygen concentration gas, a structure that changes the pressure of gas that moves through the gas separation films (85) and that adjusts the gas separation performance can be realized.

Other Embodiments

The internal air adjustment device (30) of each of the embodiments above may be modified as follows. The following modifications may be combined or replaced as appropriate as long as the function of the internal air adjustment device (30) is not impaired.

First Modification

In a marine container, since the power source voltage that is used differs from the power source voltage that is used in land facilities, the frequency of electric current is ordinarily not changed by using an inverter in a compressor of a refrigeration device for the marine container. However, when an inverter (39) (shown by a virtual line in FIG. 3) formed in accordance with the power source voltage of the marine container is used, it is possible to change the discharge amounts of the air pumps (36, 37) by changing the frequency of the electric current. Therefore, even if the inverter (39) is used as a pressure regulator, a structure that adjusts the separation performance of the gas separation films (85) in accordance with necessary gas components can be realized.

Second Modification

In the internal air adjustment device (30) of the first embodiment, the gas separation films (85) of the first separation module (41) and the gas separation films (85) of the second separation module (61) may have different characteristics.

Third Modification

In the internal air adjustment device (30) of the first embodiment, the first bypass valve (50) may be configured to make it possible to gradually or continuously change the ratio between the flow rate of untreated external air that flows into the first separation module (41) and the flow rate of untreated external air that flows into the first bypass pipe (51). The second bypass valve (70) may be configured to make it possible to gradually or continuously change the ratio between the flow rate of untreated internal air that flows into the second separation module (61) and the flow rate of untreated internal air that flows into the second bypass pipe (71).

Fourth Modification

In the internal air adjustment devices (30) of the first and second embodiments, a driving motor may be coupled to each of the first pump (36) and the second pump (37). In this modification, it is possible to operate one of the first pump (36) and the second pump (37) and stop the other of the first pump (36) and the second pump (37).

Fifth Modification

In the internal air adjustment device (30) of the second embodiment, the first composition adjustment unit (40) and the second composition adjustment unit (60) may be configured to separate sucked-in air into two types of air having different compositions by a PSA (pressure swing adsorption) method. Although the third embodiment is an example using a structure in which the PSA method is used for the second composition adjustment unit (60), in a structure that uses the PSA method for each of the first composition adjustment unit (40) and the second composition adjustment unit (60), each composition adjustment unit (40, 60) alternately and repeatedly performs a step of producing air having a low nitrogen concentration and high oxygen and high carbon dioxide concentrations by causing nitrogen that is contained in the sucked-in air to be adsorbed onto an adsorbent and a step of producing air having a high nitrogen concentration and low oxygen and low carbon dioxide concentrations by causing nitrogen to be desorbed from an adsorbent.

Sixth Modification

The internal air adjustment device (30) of each of the embodiments above may be disposed in a fixed refrigerator or freezer. The internal air adjustment device (30) of each of the embodiments above may be provided in a refrigerator/freezer container for land transportation that is transported by, for example, a truck or train. The internal air adjustment device (30) of each of the embodiments above may be provided in a refrigerator/freezer truck in which a box body that defines the load room is integrated with a chassis.

INDUSTRIAL APPLICABILITY

As described above, the present disclosure is useful for an internal air adjustment device that adjusts the composition of internal air in a storage box.

REFERENCE SIGNS LIST 1 transport container (storage box)
30 internal air adjustment device
36 first pump (air pump)
37 second pump (air pump)
39 inverter (pressure regulator)
40 first composition adjustment unit (gas composition adjustment unit)
46 first adjustment valve (valve mechanism (pressure regulator))
53 first primary side pipe (gas passage)
55 external side suction pipe (gas passage)
60 second composition adjustment unit (gas composition adjustment unit)
66 second adjustment valve (valve mechanism (pressure regulator))
73 second primary side pipe (gas passage)
75 internal side suction pipe (gas passage)
85 gas separation film
120 supply pipe (gas passage)

The invention claimed is:

1. An internal air adjustment device that adjusts a composition of internal air existing inside a storage box, comprising:
a first composition adjustment unit that includes a first separation unit that separates supply air from external air existing outside the storage box by a gas separation film, the supply air having a composition that differs from a composition of the external air, the first composition adjustment unit supplying the supply air into the storage box;
a second composition adjustment unit that includes a second separation unit that separates discharge air from the internal air existing inside the storage box by a gas separation film, the discharge air having a composition that differs from the composition of the internal air, the second composition adjustment unit discharging the discharge air to outside of the storage box, the second composition adjustment unit being configured to be capable of supplying air whose composition has been adjusted into the storage box; and
an air pump that supplies air into the first separation unit and the second separation unit,
wherein the internal air adjustment device includes a pressure regulator that regulates a pressure of air that is supplied from the air pump to at least one of the first separation unit and the second separation unit, the pressure regulator provided to adjust a separation performance of the respective gas separation film of the at least one of the first separation unit and the second separation unit.

2. The internal air adjustment device according to claim 1, wherein the pressure regulator includes a valve mechanism provided on a downstream side with respect to the gas separation film.

3. The internal air adjustment device according to claim 2, wherein the pressure regulator is provided on a downstream side with respect to the separation film of the second composition adjustment unit.

4. The internal air adjustment device according to claim 2, wherein the pressure regulator is provided respectively on a downstream side with respect to the separation film of the first composition adjustment unit and on a downstream side with respect to the separation film of the second composition adjustment unit.

5. The internal air adjustment device according to claim 1, wherein the pressure regulator is provided on an inflow side where air flows into the air pump.

6. The internal air adjustment device according to claim 1, wherein the pressure regulator is provided on an outflow side where air flows out from the air pump.

7. The internal air adjustment device according to claim 1, wherein the pressure regulator includes an inverter that changes a flow rate by changing a frequency of an electric current that is supplied to the air pump.

8. An internal air adjustment device that adjusts a composition of internal air existing inside a storage box, comprising:
a first composition adjustment unit that includes an adsorption unit that is provided with an absorbent, and that separates nitrogen and oxygen/carbon dioxide from the internal air in the storage box and that is capable of producing low oxygen concentration gas and high oxygen concentration gas, the low oxygen concentration gas having a nitrogen concentration that is higher than a nitrogen concentration of the internal air and an oxygen concentration and a carbon dioxide concentration that are lower than an oxygen concentration and a carbon dioxide concentration of the internal air, the high oxygen concentration gas having a nitrogen concentration that is lower than the nitrogen concentration of the internal air and an oxygen concentration and a carbon dioxide concentration that are higher than the oxygen concentration and the carbon dioxide concentration of the internal air,
a second composition adjustment unit that includes a second separation unit that separates discharge air from the internal air existing inside the storage box by a gas separation film, the discharge air having a composition that differs from the composition of the internal air, the second composition adjustment unit discharging the discharge air to outside of the storage box, the second composition adjustment unit being configured to be capable of supplying air whose composition has been adjusted into the storage box; and
an air pump that supplies air into the second separation unit,
wherein the internal air adjustment device includes a pressure regulator that regulates a pressure of air that is supplied from the air pump to the second separation unit, the pressure regulator provided to adjust a separation performance of the separation film of the second separation unit.

9. The internal air adjustment device according to claim 1, comprising:
a concentration measurement instrument that measures a carbon dioxide concentration and an oxygen concentration inside the storage box; and a controller that controls the pressure of the air that is supplied from the air pump by the pressure regulator so as to enable measured values of the concentration measurement instrument to approach a predetermined target value of the carbon dioxide concentration and a predetermined target value of the oxygen concentration, to thereby regulate a separation pressure of the gas separation films of the first and second separation units.

10. The internal air adjustment device according to claim 9,
wherein when the carbon dioxide concentration inside the storage box is higher than the target value and the oxygen concentration inside the storage box is also higher than the target value, the controller causes the first composition adjustment unit to produce a low oxygen concentration gas having an oxygen concentration that is lower than an oxygen concentration of the external air to supply the low oxygen concentration gas into the storage box, and causes a separation pressure of the gas separation film of the second composition adjustment unit to be reduced to reduce a discharge amount of gas that is discharged to the outside of the storage box.

11. The internal air adjustment device according to claim 9,
wherein when the carbon dioxide concentration in the storage box is lower than the target value and the oxygen concentration in the storage box is higher than the target value, the controller causes the first composition adjustment unit to produce a low oxygen concentration gas having an oxygen concentration that is lower than an oxygen concentration of the external air to supply the low oxygen concentration gas into the storage box, and causes a separation pressure of the gas separation film of the second composition adjustment unit to be increased to increase an amount of the air whose composition has been adjusted and that is returned to the storage box.

12. The internal air adjustment device according to claim 9, wherein
when the carbon dioxide concentration in the storage box is lower than the target value and the oxygen concentration in the storage box is also lower than the target value, the controller causes a high oxygen concentration gas having an oxygen concentration that is higher than an oxygen concentration of the external air produced by the first composition adjustment unit or the external air to be supplied into the storage box, and causes a separation pressure of the gas separation film of the second composition adjustment unit to be increased to increase an amount of the air whose composition has been adjusted and that is returned to the storage box.

13. The internal air adjustment device according to claim 9, wherein when the carbon dioxide concentration in the storage box is higher than the target value and the oxygen concentration in the storage box is lower than the target value, the controller performs an operation in which the external air is supplied into an internal space and a carbon dioxide gas produced by increasing a separation pressure of the gas separation film of the second composition adjustment unit and having a carbon dioxide concentration that is higher than a carbon dioxide concentration of the internal air is discharged into an external space, or an operation in which a high oxygen concentration gas produced by the first composition adjustment unit and having an oxygen concentration that is higher than an oxygen concentration of the external air is supplied into the internal space, and the separation pressure of the separation film of the second composition adjustment unit is reduced to reduce an amount of air whose composition has been adjusted and that is discharged to the outside of the storage box.

14. The internal air adjustment device according to claim 8, wherein the pressure regulator includes a valve mechanism provided on a downstream side with respect to the gas separation film.

15. The internal air adjustment device according to claim 14, wherein the pressure regulator is provided on a downstream side with respect to the separation film of the second composition adjustment unit.

16. The internal air adjustment device according to claim 8, wherein the pressure regulator is provided on an inflow side where air flows into the air pump.

17. The internal air adjustment device according to claim 8, wherein the pressure regulator is provided on an outflow side where air flows out from the air pump.

18. The internal air adjustment device according to claim 8, wherein the pressure regulator includes an inverter that changes a flow rate by changing a frequency of an electric current that is supplied to the air pump.

* * * * *